US005546323A

United States Patent [19]
Bacus et al.

[11] Patent Number: 5,546,323
[45] Date of Patent: Aug. 13, 1996

[54] METHODS AND APPARATUS FOR MEASURING TISSUE SECTION THICKNESS

[75] Inventors: James W. Bacus, Hinsdale; James V. Bacus, Lombard, both of Ill.

[73] Assignee: Cell Analysis Systems, Inc., Franklin Lakes, N.J.

[21] Appl. No.: 542,102

[22] Filed: Oct. 12, 1995

Related U.S. Application Data

[63] Continuation of Ser. No. 961,782, Oct. 16, 1992, abandoned, which is a continuation-in-part of Ser. No. 595,117, Oct. 10, 1990, Pat. No. 5,235,522.

[51] Int. Cl.$^6$ ..................................................... G01N 1/02
[52] U.S. Cl. ........................... 364/497; 364/496; 364/555; 364/413.08; 364/413.1; 382/133
[58] Field of Search ..................................... 364/496, 497, 364/555, 413.08, 413.1, 13.02; 356/39; 382/133; 436/805, 10, 63

[56] References Cited

U.S. PATENT DOCUMENTS

| | | | |
|---|---|---|---|
| 3,833,796 | 9/1974 | Fetner et al. | 364/413.1 |
| 4,097,845 | 6/1978 | Bacus | 364/413.08 |
| 4,125,828 | 11/1978 | Resnick et al. | 364/413.08 |
| 4,199,748 | 4/1980 | Bacus | 364/413.08 |
| 4,404,683 | 9/1983 | Kobayashi et al. | 364/413.08 |
| 4,523,278 | 6/1985 | Reinhardt et al. | 364/413.1 |
| 4,656,594 | 4/1987 | Ledley | 364/413.1 |
| 4,661,913 | 4/1987 | Wu et al. | 364/555 |
| 4,741,043 | 4/1988 | Bacus | 364/413.13 |
| 4,833,629 | 5/1989 | Moore | 365/555 |
| 4,987,539 | 1/1991 | Moore et al. | 364/555 |
| 5,018,209 | 5/1991 | Bacus | 364/413.08 |
| 5,023,785 | 6/1991 | Adrion et al. | 364/413.08 |
| 5,072,382 | 12/1991 | Kamentsky | 364/413.08 |
| 5,086,476 | 2/1992 | Bacus | 364/413.08 X |
| 5,088,816 | 2/1992 | Tomioha et al. | 356/39 |
| 5,109,429 | 4/1992 | Bacus et al. | 382/6 |
| 5,121,320 | 6/1992 | Aohi et al. | 382/6 |
| 5,235,522 | 8/1993 | Bacus | 364/497 |
| 5,281,517 | 1/1994 | Bacus et al. | 435/6 |

OTHER PUBLICATIONS

"An Analysis Of DNA Cytophotometry on Tissue Sections In A Rat Liver Model" R. W. McCready, B.Sc.; J. M. Papadimitriou, M. D., Ph.D. *Analytical and Quantitative Cytology*, vol. 5, No. 2, Jun. 1983.

"Measuring The Forces Acting During Microtomy By The Use Of Load Cells" *Journal of Microscopy*, vol. 159, pt. 2 Aug. 1990, pp. 203–210.

(List continued on next page.)

*Primary Examiner*—Ellis B. Ramirez
*Assistant Examiner*—Hal D. Wachsman
*Attorney, Agent, or Firm*—Allen W. Wark

[57] ABSTRACT

An apparatus and method for measuring the thickness of a tissue section with an automated image analysis system, preferably using polyploid nuclear DNA content, for subsequent use in analyzing cell objects of a specimen cell sample for the diagnosis and treatment of actual or suspected cancer or monitoring any variation in the nominal thickness in a microtome setting. An image of a measurement material, such as a rat liver tissue section, having known cell object attributes is first digitized and the morphological attributes, including area and DNA mass of the cell objects, are automatically measured from the digitized image. The measured attributes are compared to ranges of attribute values which are preestablished to select particular cell objects. After the selection of the cell objects, the operator may review the automatically selected cell objects and accept or change the measured cell object attribute values. In a preferred embodiment, each selected cell object is assigned to one of three classes corresponding to diploid, tetraploid and octoploid cell morphology and the measured DNA mass of the identified cell object fragments in the rat liver tissue section sample may be corrected. Next, the selected cell objects of the measurement material, e.g., DNA Mass, are then graphically displayed in a histogram and the thickness of the rat liver tissue section can be measured based upon the distribution.

10 Claims, 20 Drawing Sheets

OTHER PUBLICATIONS

Bacus, James W.: Methods in Pathology–A Method of Correcting DNA Ploidy Measurements in Tissue Sections. Mod Pathol 7:652,1994.

Danque POV, Chen HB, Patil J, Jagirdar J, Orsatti G, Paronetto F: Image analysis versus flow cytometry for DNA ploidy quantitation of solid tumores: a comparison of six methods of sample preparation. Mod Pathol 6:270,1993.

Suit PF, Bauer TW: DNA quantitation by image cytometry of touch preparatinos from fresh and frozen tissue. Am J Clin Pthol 94:49,1990.

Greene DR, Taylor SR, Wheeler TM, Scardino PT: DNA ploidy by image analysis of individual foci of prostate cancer: a preliminary report. Cancer Res 51:4084,1991.

Weiber ER: Steological Methods, vol. 1, p. 40; vol. 2, p. 175. New York, Academic Press,1980.

McCready RW, Papadimitriou JM: An analysis of DNA cystophotometry on tissue sections in a rat liver model. Anal Quant Cytol Histol 5:117,1983.

Gurley AM, Hidvegi DF, Bacus JW, Bacus SS: Comparison of the Papanicolaou and Feulgen staining methods for DNA quantification by image analysis. Cytometry 11:468,1990.

Bacus JV: The CAS200™ Multiscan™ automated pawthology workstation.In The Compendium on the Computerized Cytology and Histology Laboratory, edited by Wied GL, Bartels PH, Rosenthal DL, Schenk U, p. 360. Chicago, Tutorials of Cytology, 1994.

Cell Analysis Systems: CAS Quantitative DNA Analysis, Users Guide Version 3.0. Elmhurst, Il, Cell Analysis Systems,Inc.,1993.

Bacus JW, Grace LJ: Optical microscope system for standardized cell measurements and analyses. Appl Optics 26:3280,1987.

Mikel UV: Absolute DNA values from Feulgen microspectrophotometric measurements and quantitative electron microscopy. Anal Quant Cytol Histol 9:13,1987.

Allison RT, Vincent JF: Measuring the forces acting during microtomy by the use of load cells. J Microsc 159:203,1990.

FIG-11

―――― RATLIVER ―――― ON

|  | Class 1 Min – Max | Class 2 Min – Max | Class 3 Min – Max |
|---|---|---|---|
| AREA ($\mu m^2$) | 19 – 31 | 0 – 0 | 51 – 79 |
| SHAPE | 10 – 14.5 | 0 – 0 | 10 – 14.5 |
| pg DNA | 5 – 8.35 | 0 – 0 | 9 – 12.2 |
| DENSITY | 0.1 – 0.4 | 0 – 0 | 0.14 – 0.182 |

|  | Class 4 Min – Max | Class 5 Min – Max | Class 6 Min – Max |
|---|---|---|---|
| AREA ($\mu m^2$) | 0 – 0 | 80 – 130 | 0 – 0 |
| SHAPE | 0 – 0 | 10 – 14.5 | 0 – 0 |
| pg DNA | 0 – 0 | 15 – 23 | 0 – 0 |
| DENSITY | 0 – 0 | 0.14 – 0.23 | 0 – 0 |

Note: Rat Diploid, Tetraploid, Octaploid Filter

FIG-12

```
─────────────── PROSTATE ─────────────── ON ──

1 Diploid Sm1     2 Diploid Leg    3 S-Phase
                Min   Max         Min   Max        Min   Max
AREA (μm²)     16  –  45         16  – 1000        0  – 1000
SHAPE          10  –  16         10  –  16        10  –  16
pg DNA        6.47 –  7.96      6.47 –  7.96     7.97 – 12.91
DENSITY       0.15 –  0.5          0 – 1000         0 – 1000

4 Diploid Ireg    5 Tetraploid     6 > Tetraploid
                Min   Max         Min   Max        Min   Max
AREA (μm²)     16  –  45          0  – 1000        0  – 1000
SHAPE          10  –  22         10  –  22        10  –  22
pg DNA        6.47 –  7.96     12.96 – 15.89     15.9 – 1000
DENSITY       0.15 –  0.5         0 – 1000         0 – 1000

Note: 3 classes of Diploid and Aneuploid nuclei
```

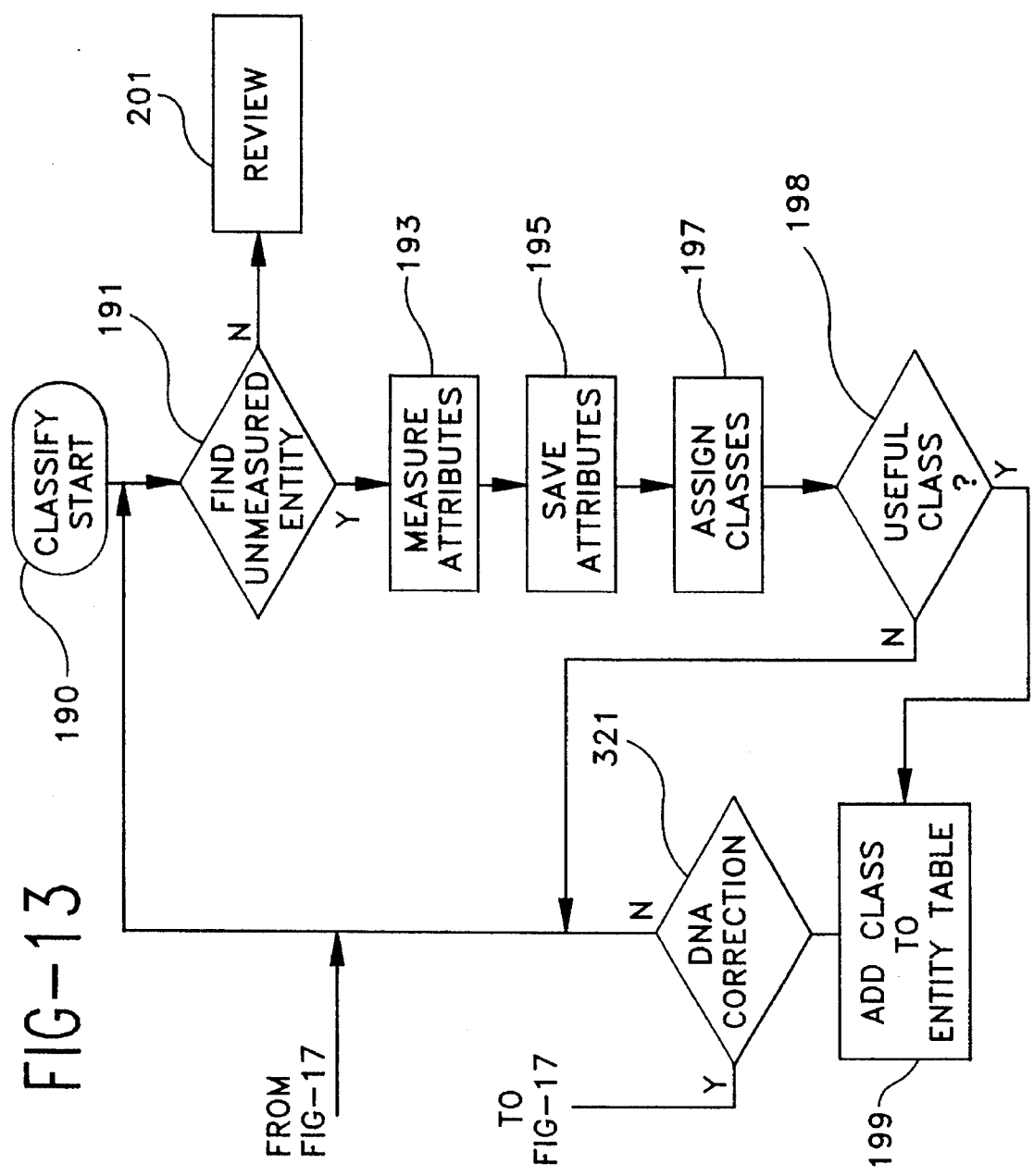

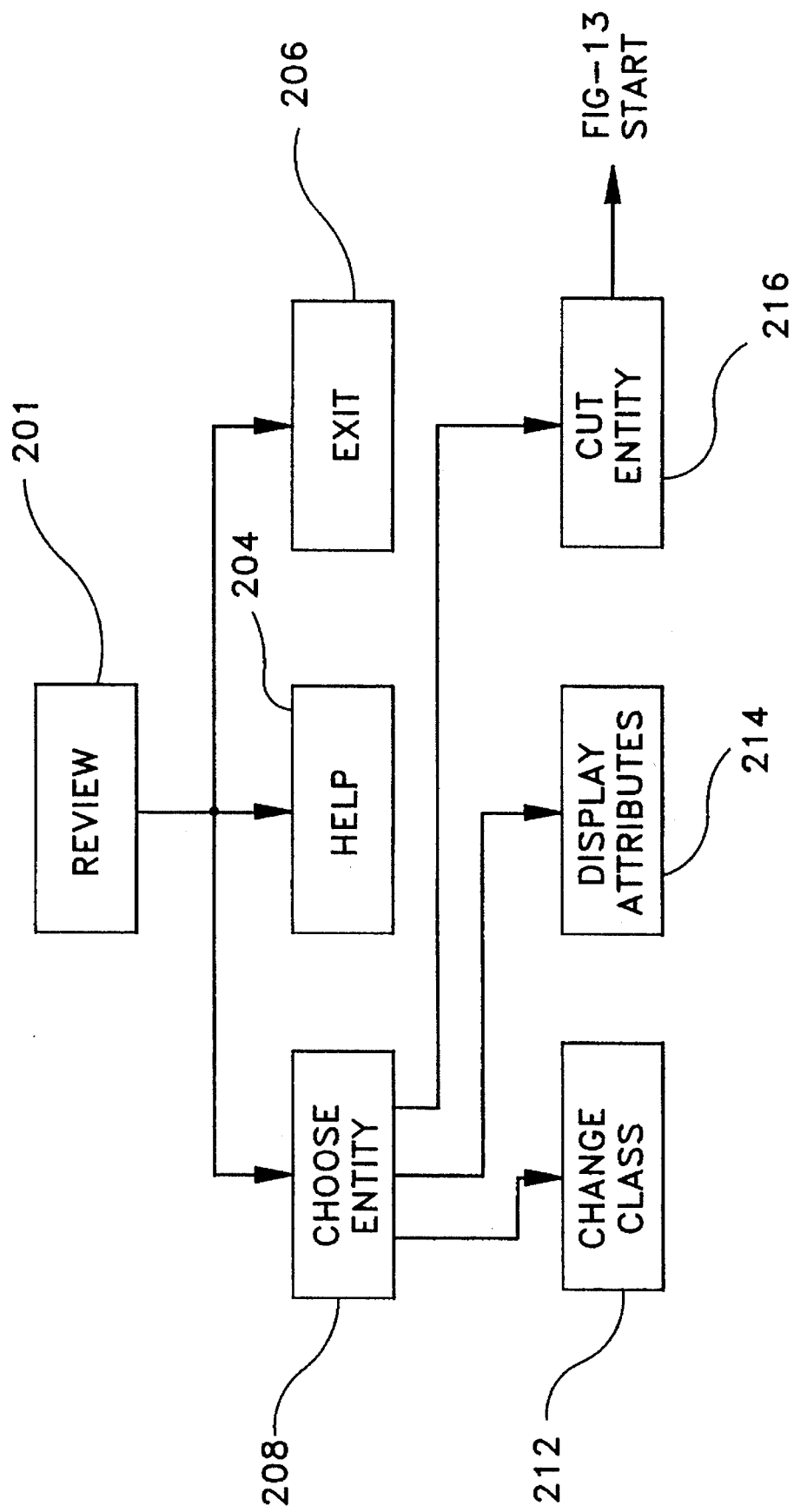

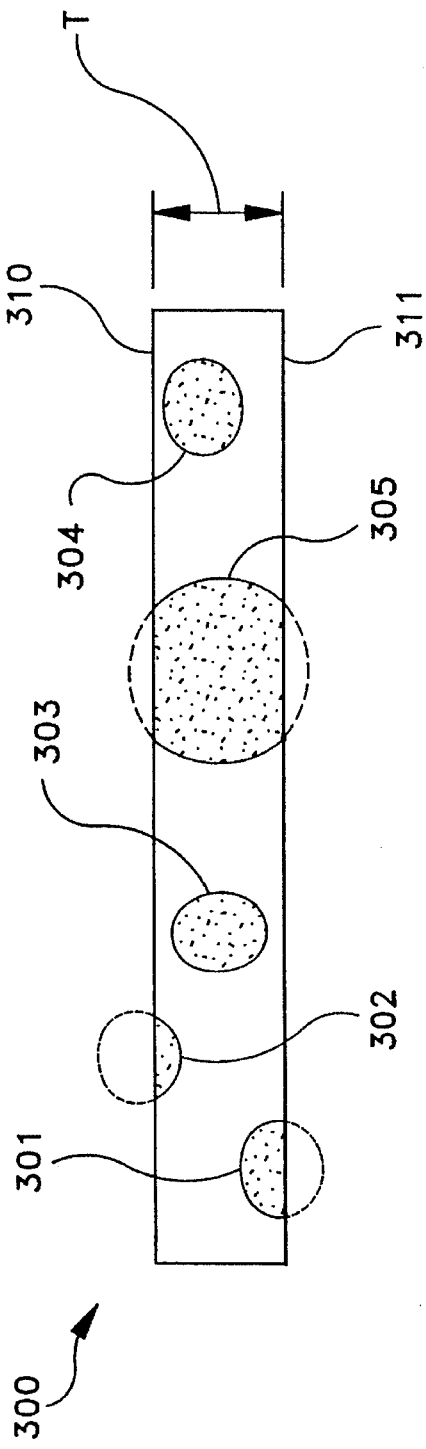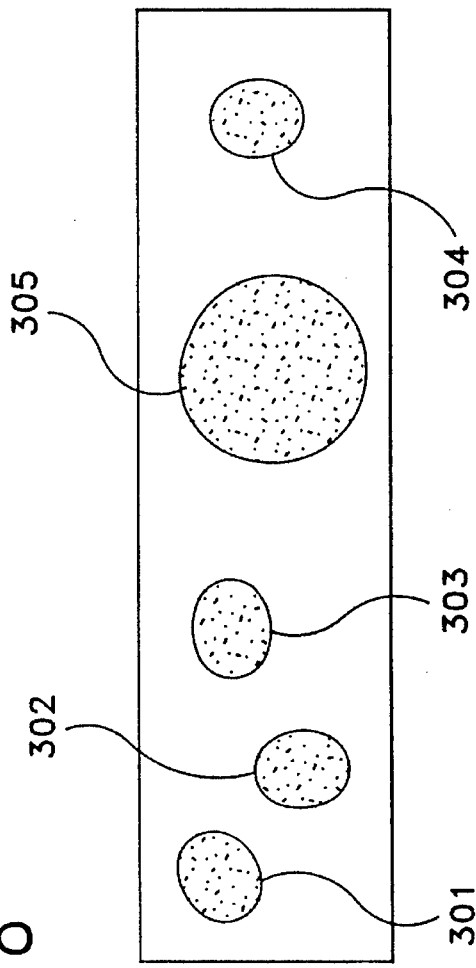

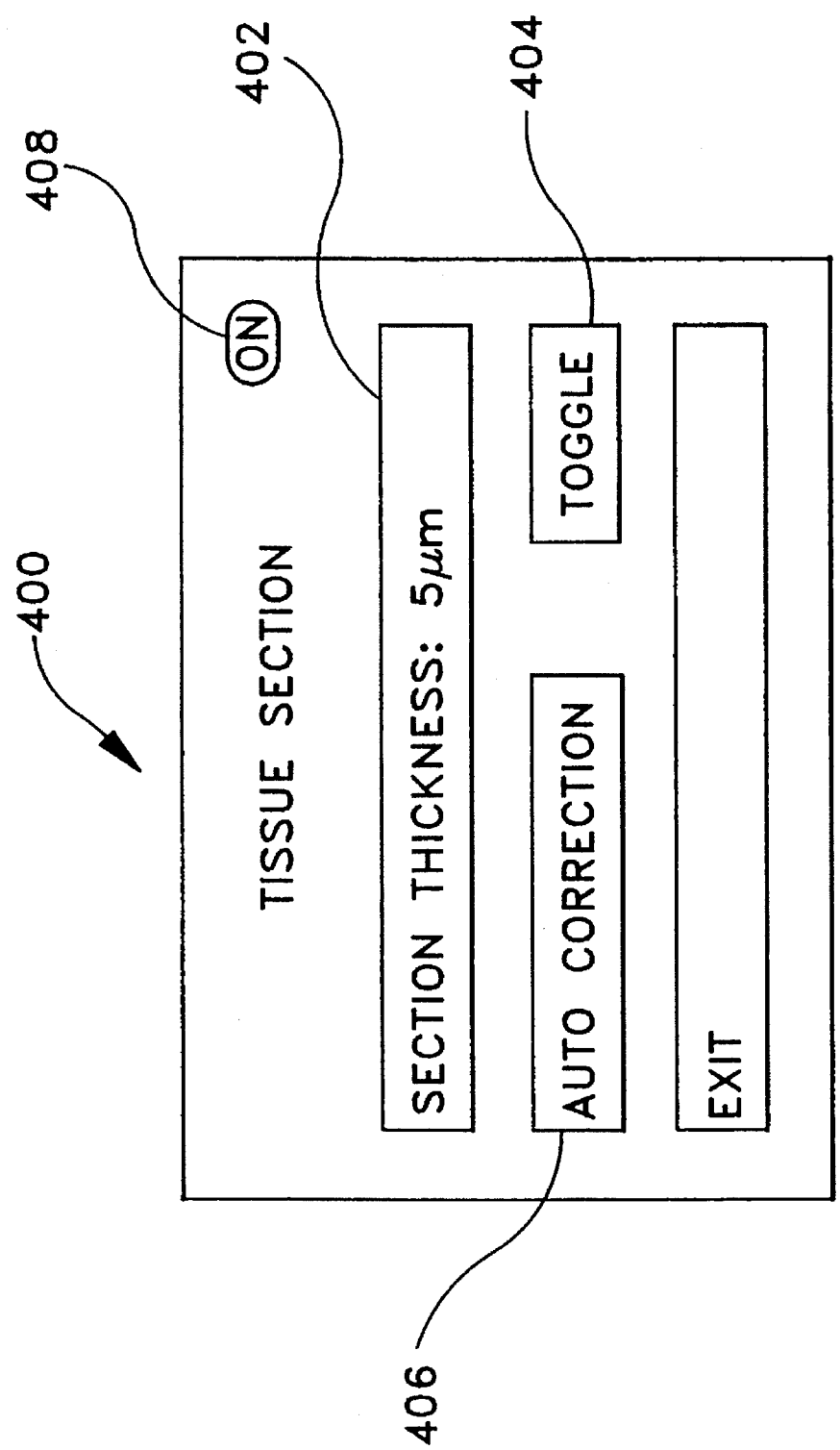

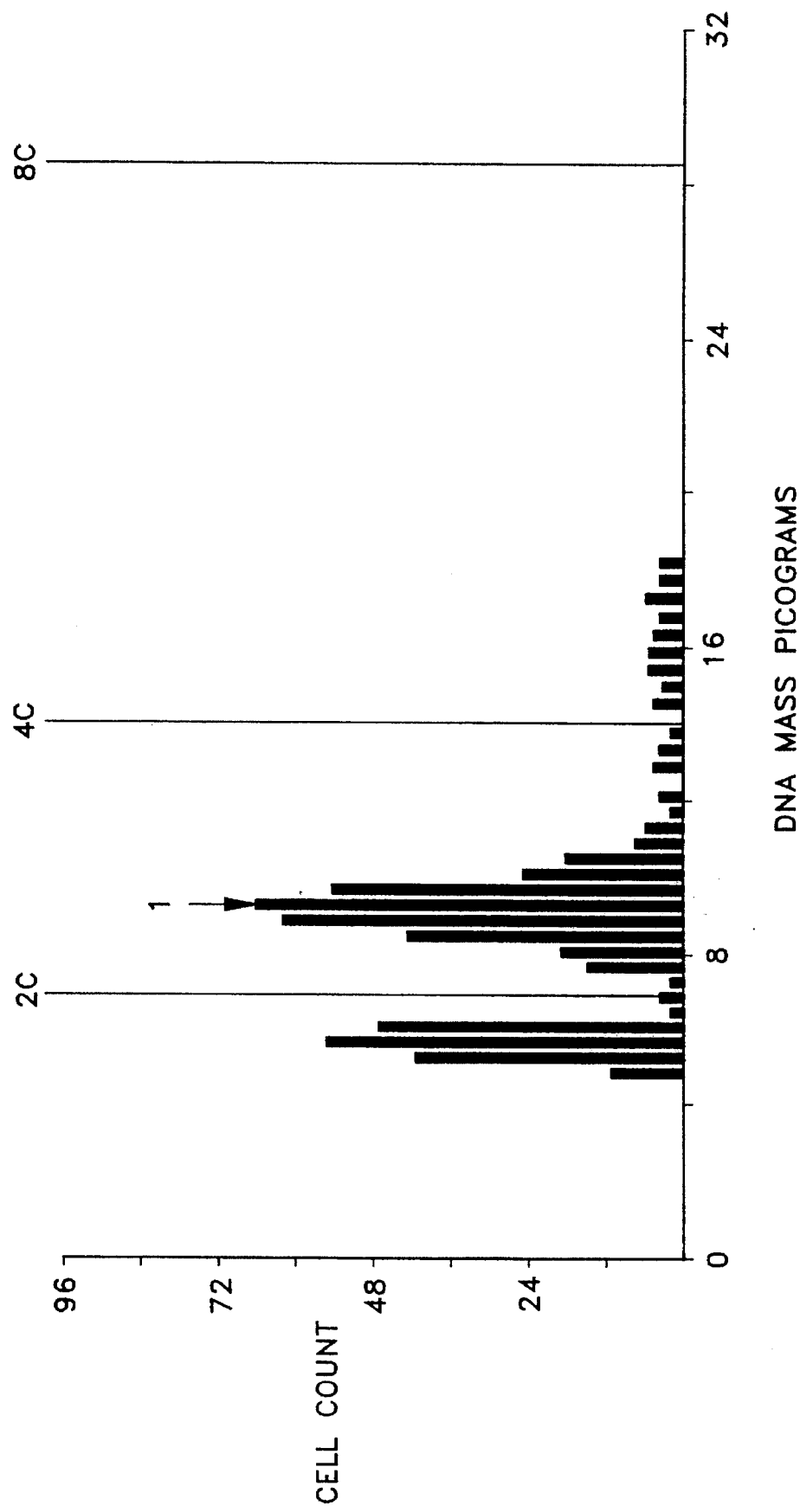

METHODS AND APPARATUS FOR MEASURING TISSUE SECTION THICKNESS

CROSS-REFERENCE TO RELATED APPLICATION

This application is a continuation of application Ser. No. 07/961,782, originally filed Oct. 16, 1992, now abandoned, which is a continuation-in-part of application Ser. No. 07/595,117, filed Oct. 19, 1990, U.S. Pat. No. 5,234,522.

FIELD OF THE INVENTION

This invention generally relates to methods and apparatus for measuring tissue section thickness, and more particularly, for measuring tissue section thickness with an automated image analysis system using section material of known DNA content, and then using such section thickness to more accurately measure attributes in test specimens of similar thickness including the DNA ploidy of such test specimens.

BACKGROUND OF THE INVENTION

The diagnosis/prognosis of a possible cancer typically includes the removal of a cell sample, such as a tissue mass, from the patient. Although an attending physician may have good intuition regarding the patient's diagnosis/prognosis, confirmation of the diagnosis with a histological examination of the cell sample removed from the patient is necessary. The histological examination entails cell staining procedures which allow the morphological features of the cells to be seen relatively easily in a light microscope. A pathologist, after having examined the stained cell sample, makes a qualitative determination of the state of the tissue and reaches a conclusion regarding the prognosis for the patient. While this diagnostic method has a long history, it is somewhat lacking in scientific rigor since it is heavily reliant on the subjective judgment of the pathologist and it is extremely time consuming.

Typically, the cell samples are embedded in a paraffin block from which tissue sections are cut by a microtome instrument. The optical evaluation of such cell samples, particularly those taken from microtomed tissue sections, is a difficult procedure. The optical field presented to an evaluator is a disordered collection of cell objects, some on top of one another and others being only fragments of whole cell objects. The optical field shows only boundaries of two-dimensional optical entities filled with varying levels of contrast. Some of the overlapped cell objects appear to be large and/or dense single cell objects and some of the cell object fragments appear to have sufficient size to be whole cell objects. Faced with this random cluster of images, the evaluator's difficult and time-consuming task is the selection of single whole cell objects which can accurately represent the cell sample and the classification of those selected objects into categories which classification aids in the final diagnosis/prognosis.

It is well known that the DNA content of cell objects can provide valuable information in cancer diagnosis. Systems have been developed which utilize the DNA content of cell objects to improve histological examination. In U.S. Pat. No. 4,741,043 to Bacus for Method and Apparatus for Image Analyses of Biological Specimens, an automated method and a system for measuring the DNA of cells are disclosed which employ differential staining of the DNA in cell nuclei with a Feulgen stain and image processing. After staining, optical fields of the cell sample are presented to an evaluator who selects objects for analysis and categorizes the selected objects. Certain attributes including the DNA mass of the operator selected cell objects are then measured and used to produce reports such as DNA histograms.

The arrangement and method of Bacus U.S. Pat. No. 4,741,043 have been well received both for the reports generated and for the improvements in the use of operator time. The operator, however, must still select relevant cell objects from the optical field presented and classify the selected cell objects into classes before machine measurement of attributes occurs. Such selection and classification is especially tedious in cut tissue section specimens, in contrast to whole cell preparations. It requires the thoughtful review of each object in the random cluster of images of an observed field. Further, the only input information available for such review is the varying contrast levels presented by the visual image. When the operator must evaluate cell samples for a long period of time, as is the case in some pathology laboratories, concentration by the operator and accuracy of the decisions made, may be affected.

This need for a more automated method and arrangement for use with a DNA analysis apparatus, which selects whole, single cell objects and classifies each selected cell object as being in a particular one of a plurality of diagnostic aiding categories as well as in particular regions of the DNA distribution has been meet by the arrangement and method disclosed in co-pending patent application Ser. No. 07/595,117, filed Oct. 10, 1990, U.S. Pat. No. 5,235,552. This automatic selection and classification of cell objects speeds analysis and reduces the tedium of the operator. Also, pre-selection and classification by the apparatus permits the operator to concentrate his or her efforts on the difficult and subtle analysis of the preselected cell objects which are likely to be representative of the sample. With this system, the measured DNA mass of such fragments can be corrected (increased) to reflect the DNA mass of their source whole cell object as suggested by McCready et al. in an article published in Analytical Quantitative Cytology, Vol. 5, No. 5, June 1983, pp. 117–123, entitled "An Analysis of DNA Cytophotometry on Tissue Sections in a Rat Liver Model," the disclosure of which is hereby incorporated by reference in its entirety. After the automatic measurement of cell object attributes, cell object fragments which are likely to have analysis value are identified from their measured attributes and the cell object attributes are corrected to reflect the attributes of the whole cell objects from which the fragment was sectioned.

The valuable cell object fragments are then identified by comparing the measured cell object area with a threshold value determined from the thickness of a tissue section from which the sample was taken. If the measured cell object area is larger than the threshold, the cell object is identified for correction since it is too large to be entirely included within the tissue section. A correction value is then determined from the measured area and the tissue section thickness and used to increase the measured DNA mass of the identified cell object fragment.

The correction value C is determined from the equation:

$$C = \frac{3T}{4R} - \frac{T^3}{16R^3}$$

where T is the tissue section thickness and R equals the square root of the measured area divided by $\pi$. The formula yields a correction value between 0 and 1 for identified cell objects, which value is divided into the measured DNA mass of the cell object to increase the DNA mass to a corrected value representing the whole cell object.

A problem and limitation in the evaluation of the cell objects and their accurate reporting remains as a result of variations in the thickness of the tissue section used in determining the variation constant C. Normally, the microtome instrument is set, e.g., at 5μ, and this thickness setting is used by the particular operator and/or the particular lab. However, the act of slicing the tissue section results in variations in the thickness of the tissue section as suggested by Allison et al. in an article published in the Journal of Microscopy, Vol. 159, Pt. 2, August 1990, pp. 203–210, entitled "Measuring the forces acting during microtomy by the use of load cells." Thus, the actual thickness may vary depending upon the conditions present during cutting of the paraffin block and the microtome setting may not accurately reflect the actual thickness of the tissue section from which the sample was taken.

Thus, a need exists for methods and apparatus for measuring the thickness of tissue sections to compensate for variations from the microtome setting, and especially a method that can be used in conjunction with an analysis of DNA, thereby, improving the accuracy and reliability of the image analysis systems used to identify the cell object fragments likely to possess analysis value and properly correct their measured attributes to reflect what those attributes would have been, had the identified cell object not been fragmented. In addition, there has been a need for such methods and apparatus to measure the thickness of the tissue section for comparison with the nominal thickness determined from the microtome setting to calibrate the microtome instrument and to provide some degree of quality control in connection with the microtome instrument.

SUMMARY OF THE INVENTION

In contrast to the prior methods and devices discussed above, it has been found that method and apparatus of the present invention have been found to be particularly suited for measuring the thickness of a tissue section for subsequent use, including to analyze a specimen sample or to calibrate a microtome instrument.

The method of measuring the thickness of a tissue section in an analysis apparatus includes the steps of providing a tissue section including a plurality of cell objects, automatically measuring by the analysis apparatus a plurality of attributes of the cell objects and selecting certain cell objects, and determining the thickness of the tissue section from the selected cell objects.

In the preferred embodiment, the method further includes the step of displaying a distribution of the selected cell objects based upon their measured attributes. In addition, the step of determining the thickness may include a step of adjusting the distribution of the selected cell objects to determine the thickness of the tissue section. Also, the step of determining the thickness may include a step of entering a value for a nominal thickness setting and adjusting the value to measure the thickness of the tissue section. The step of entering a value may also include iteratively adjusting the value until a chosen distribution of the selected cell objects is displayed or may include iteratively adjusting the value to obtain a distribution known to be associated with the selected cell objects. Alternatively, the step of entering a value may include automatically adjusting the value to affect a selected peak of the distribution.

The method of measuring the thickness of a tissue section for use in analyzing a specimen cell sample in an automatic analyzing apparatus of the present invention includes the steps of providing a measurement cell sample and a specimen cell sample, measuring, by the apparatus, attributes of individual cell objects of the measurement cell sample and the specimen cell sample, comparing by the apparatus the measured attributes to predetermined parameters distinctive of the cell objects and selecting certain cell objects, determining the thickness of the measurement cell sample from a distribution of the cell objects of the measurement cell sample, and utilizing the determine thickness of the measurement cell sample in analyzing the specimen cell sample by the apparatus.

The method of analyzing a cell sample in an automatic analyzing apparatus to measure a thickness of a tissue section to calibrate a setting of a microtome instrument of the present invention includes the steps of providing a cell sample comprising whole cell objects and cell object fragments for analysis, measuring, by the apparatus, attributes of individual cell objects of the cell sample, comparing by the apparatus the measured attributes to predetermined parameters distinctive of whole cell objects and selecting certain cell objects, determining the thickness of the cell sample from the distribution of the cell objects, and identifying ones of the selected cell objects which are to have their DNA mass values corrected and correcting the DNA mass value of the identified ones of the selected cell objects by an amount computed from the tissue section thickness and the measured area of the cell object to be corrected.

The method of analyzing a cell sample in an automatic analyzing apparatus of the present invention includes the steps of providing a cell sample, measuring, by the apparatus, attributes of individual cell objects of the cell sample and selecting certain cell objects, comparing by the apparatus the measured attributes to predetermined parameters distinctive of the cell objects, calibrating the apparatus by analyzing the cell sample, and determining the thickness of the cell sample from a distribution of the cell objects of the cell sample.

In addition, the method may include the step of utilizing the thickness of the cell sample in analyzing a specimen cell sample by the apparatus.

The apparatus for measuring the thickness of a tissue section including a plurality of cell objects of the present invention includes means for measuring a plurality of cell object attributes of each of the cell objects and selecting certain cell objects, means, responsive to the measuring means, for assigning one of a plurality of mutually exclusive classes to selected ones of the cell objects, and means for determining the thickness of the tissue section from the selected cell objects.

In the preferred embodiment of the apparatus of the present invention, the measuring means may include means for forming an image of the plurality of cell objects, means for digitizing the formed image, and means for determining values for the measured attributes from the digitized image. In addition, the apparatus may include means for displaying the relative occurrence of selected cell objects having predetermined attributes. The means for determining the thickness of the tissue section may include means for adjusting an entered value for the thickness of the tissue section to affect the display. Further, the apparatus may include means for automatically adjusting the display of selected cell objects to determine the thickness of the tissue section.

BRIEF DESCRIPTION OF THE DRAWINGS

The various features, objects, benefits, and advantages of the present invention will become more apparent upon reading the following detailed description of the preferred embodiment along with the appended Claims in conjunction with the drawings, wherein like reference numerals identify corresponding components, and:

FIG. 11 is a representation of the filter menu screen shown during the set filter function of FIG. 8 for a pre-set filter for use with a rat liver section;

FIG. 12 is a representation of the filter menu screen shown during the set filter function of FIG. 8 for a pre-set filter for use with a prostate specimen cell sample;

FIG. 13 is a flow diagram of the classify function shown in FIG. 9;

FIG. 14 is a representation of an optical entity table stored for each optical entity of an observed sample;

FIG. 16 is a representation of the menu screen presented during the performance of the review function;

FIG. 17 is an edge view of a tissue section cell object sample;

FIG. 18 is a top view of the tissue section sample of FIG. 17;

FIG. 19 is a representation of a video screen presented during the set thickness function of FIG. 9;

FIG. 21 is a histogram of a video screen presented during classification of the cell objects during the operation of FIG. 13;

DETAILED DESCRIPTION OF THE PREFERRED EMBODIMENT

Figure 1:
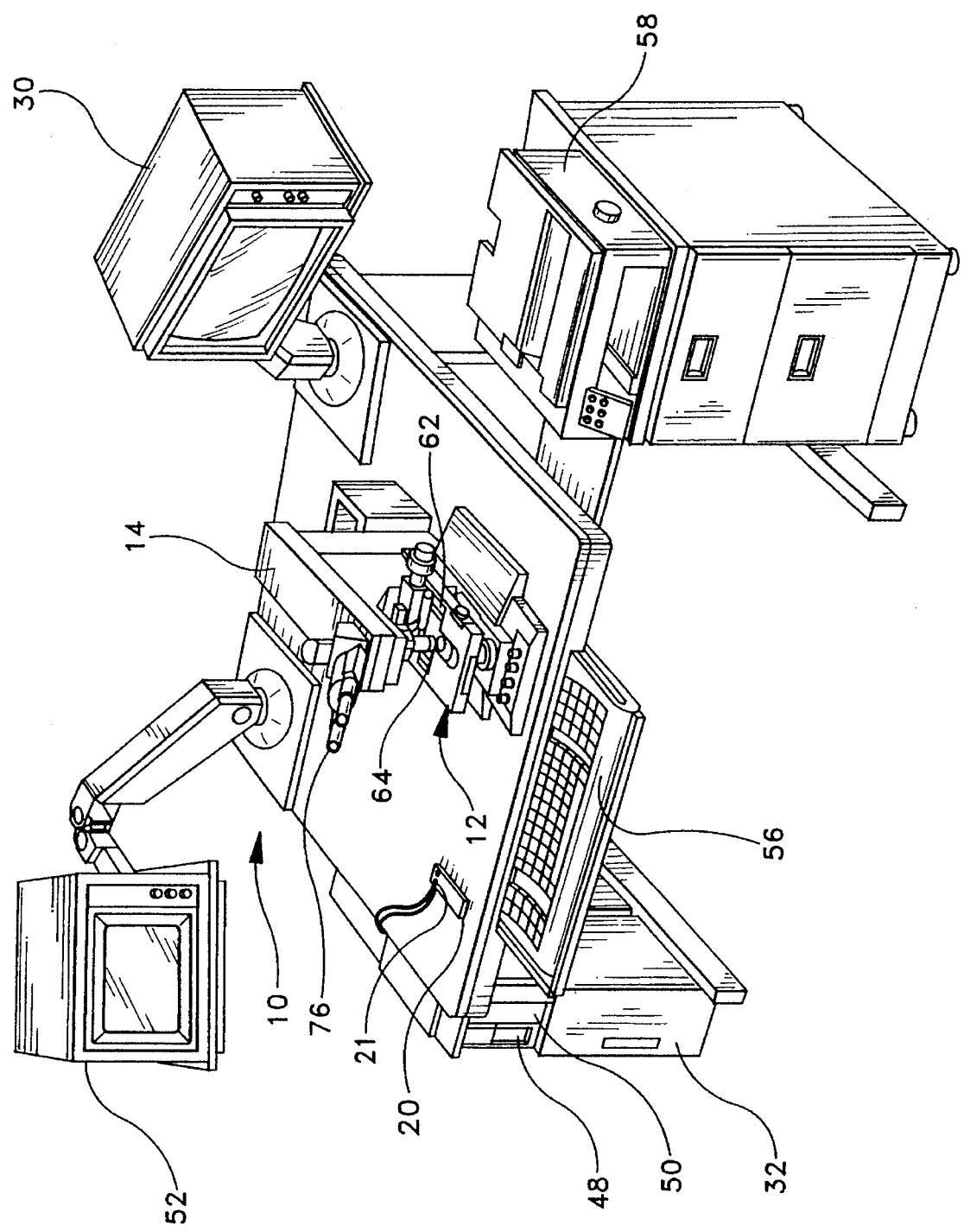
FIG. 1 is an isometric view of an image analysis system embodying the present invention for measuring the thickness of a tissue section.

As shown in the drawings and described herein, the invention is embodied in methods and apparatus for measuring tissue section thickness in connection with an image analysis system to compensate for variations in the nominal thickness of the tissue section determined from the setting of a microtome instrument, such tissue section thickness is subsequently used in automatically analyzing cell objects. The term "cell objects" is used herein to be generic to cells or the nuclei of cells such as those taken from tumors or the like or obtained from cultured cell lines, and which are checked for their DNA content or other attribute and also to be generic to non-biological objects such as plastic or glass spheres. It should also be appreciated that DNA mass as used herein may mean a calibrated DNA mass measurement or relative sum optical density.

Figure 2:
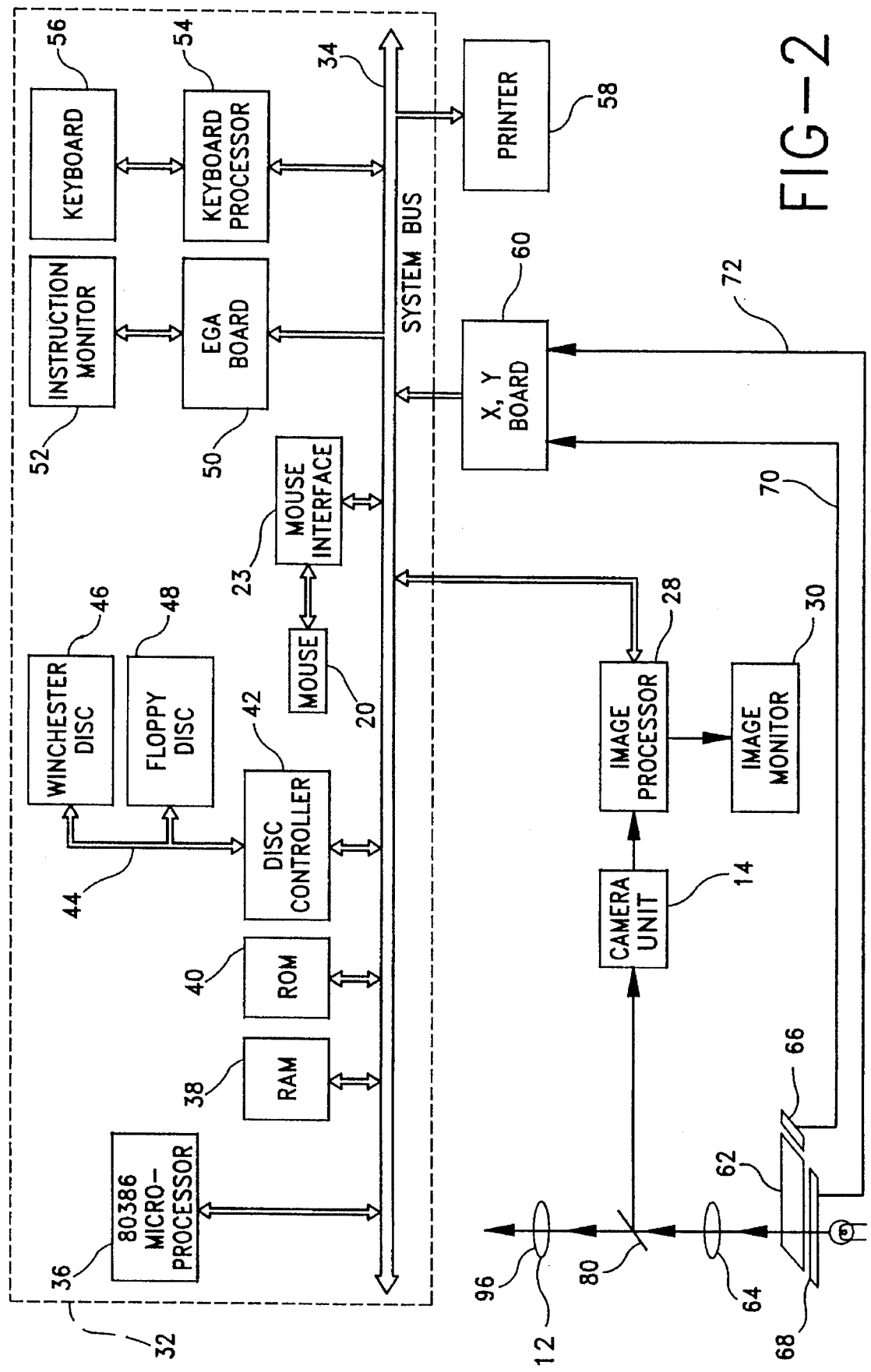
FIG. 2 is a block diagram of the apparatus of FIG. 1.

The preferred apparatus of the present invention used to measure the thickness and analyze the cell objects is illustrated in FIGS. 1 and 2 and generally designated 10. The system is a computerized image analysis apparatus designed to measure a number of cell object features and parameters from their image on a typical glass slide. The apparatus is disclosed in greater detail in co-pending patent application Ser. No. 07/595,117 (James W. Bacus), U.S. Pat. No. 5,235,522, the disclosure of which is hereby incorporated in its entirety by reference. The apparatus includes a sophisticated digital image processing system which performs quantitative analysis on individual cells for nuclear DNA content as well as measurement of other cell features or attributes.

In the disclosed embodiment, the cell objects of interest are cell nuclei. By way of example, the present invention may be used to measure the thickness of a tissue thickness for subsequent use in the study not only of ploidy analysis but also to analyze Pap smear cells, monoclonal antibodies and other infectious diseases which can be diagnosed by DNA probes.

Figure 3:
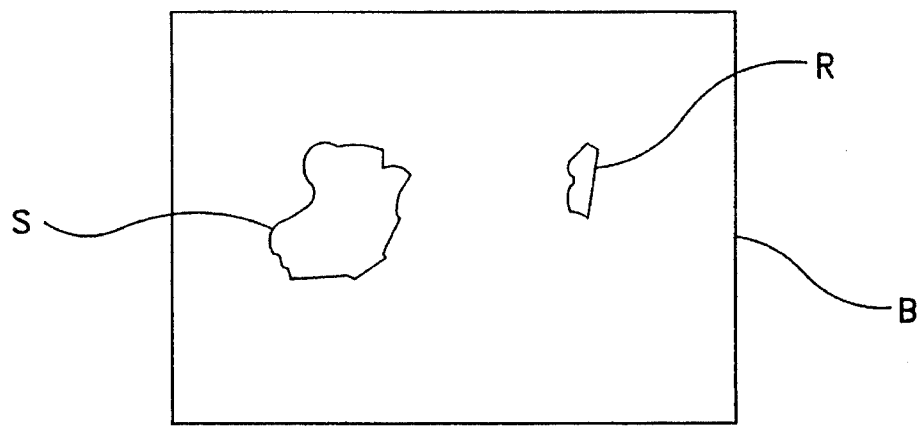
FIG. 3 is a side view of a paraffin block having a measurement material and a specimen sample embedded therein.

In accordance with the present invention, a measurement material, such as a tissue section of rat liver with cell objects therein, having known cell object attributes, e.g., diploid, tetraploid and octoploid, is prepared or other samples of cell objects such as for example a cultured cell line embedded in paraffin. In the preferred embodiment, this cell sample is prepared along with a specimen cell sample in a single paraffin block, which when viewed by the operator under a thickness setting step permits the operator of the apparatus to measure the thickness of the tissue section of the measurement material and compensate for any variation with the nominal thickness. In this preferred and illustrated embodiment of the invention, the measurement material can be embedded in a block containing the specimen sample or formed from a composite block B including the two separately embedded samples as illustrated in FIG. 3. It should also be appreciated that the measurement material may be combined with, or also used as a calibration material and used to calibrate the instrument from relative optical densities to mass units such as disclosed in U.S. Pat. No. 4,741,043, the disclosure of which is hereby incorporated by reference in its entirety.

Figure 4A:
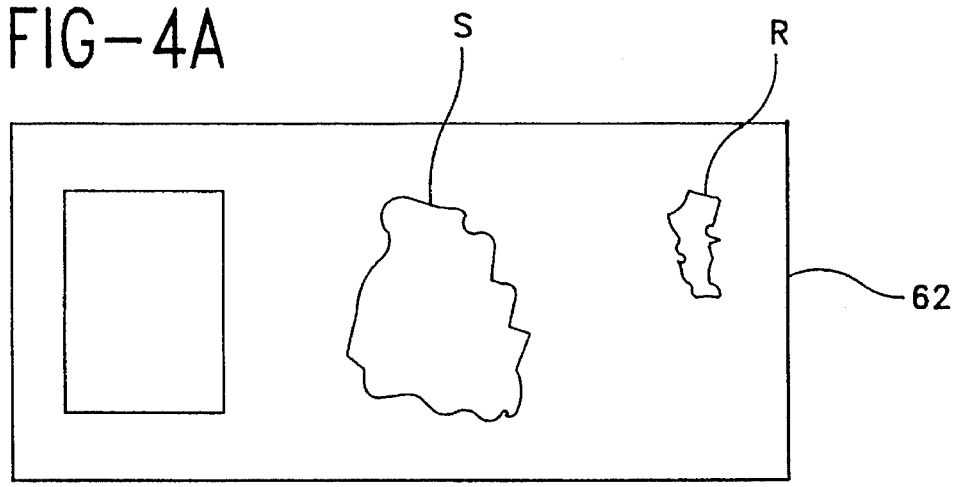
FIGS. 4A and 4B are plan views of a microscope slide having a measurement thickness material and a specimen sample affixed thereto.
Figure 4B:
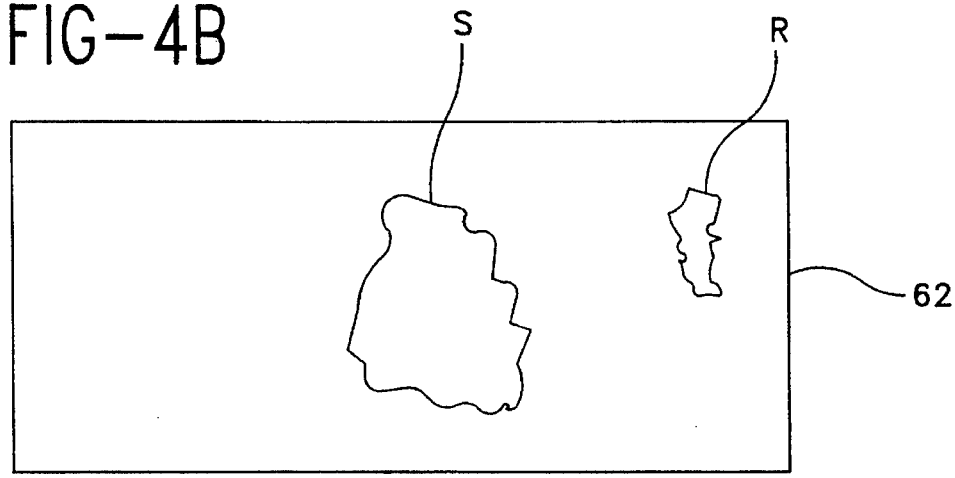

The block B is then placed on a microtome instrument (not shown) and cut into tissue sections. The tissue sections, including the measurement material, i.e., the rat liver cell sample R, and the specimen cell sample S, are then placed on a slide 62 and fixed thereon, with the thickness setting of microtome preferably recorded on the slide as illustrated in FIG. 4A with a calibration material or as illustrated in FIG.

Figure 5:
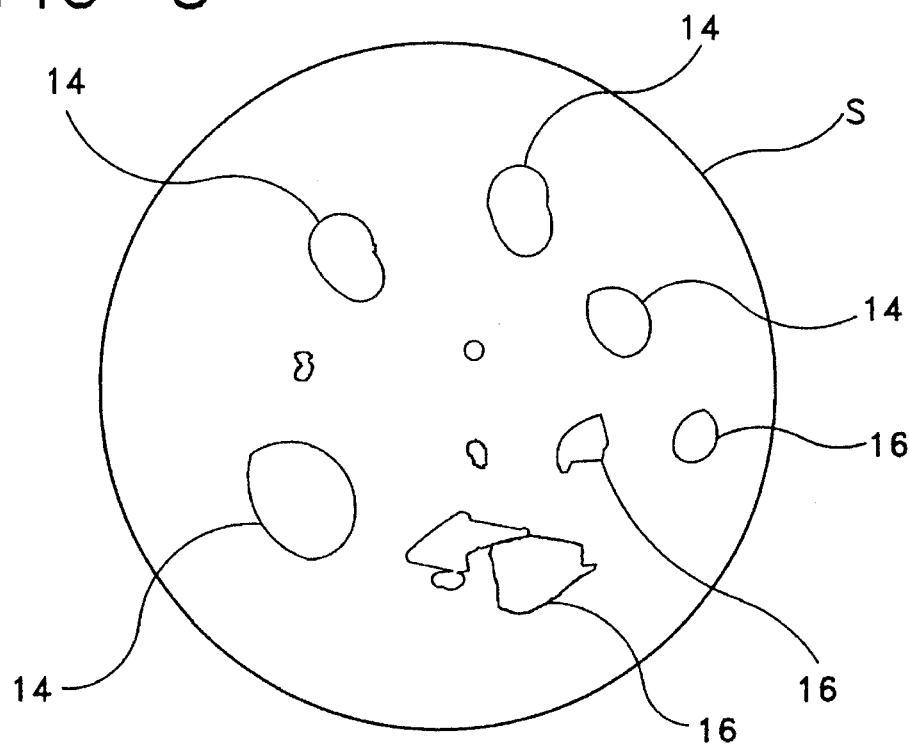
FIG. 5 is an enlarged view of an optical field of the specimen sample of FIGS. 4A and 4B as seen through a microscope.
Figure 6:
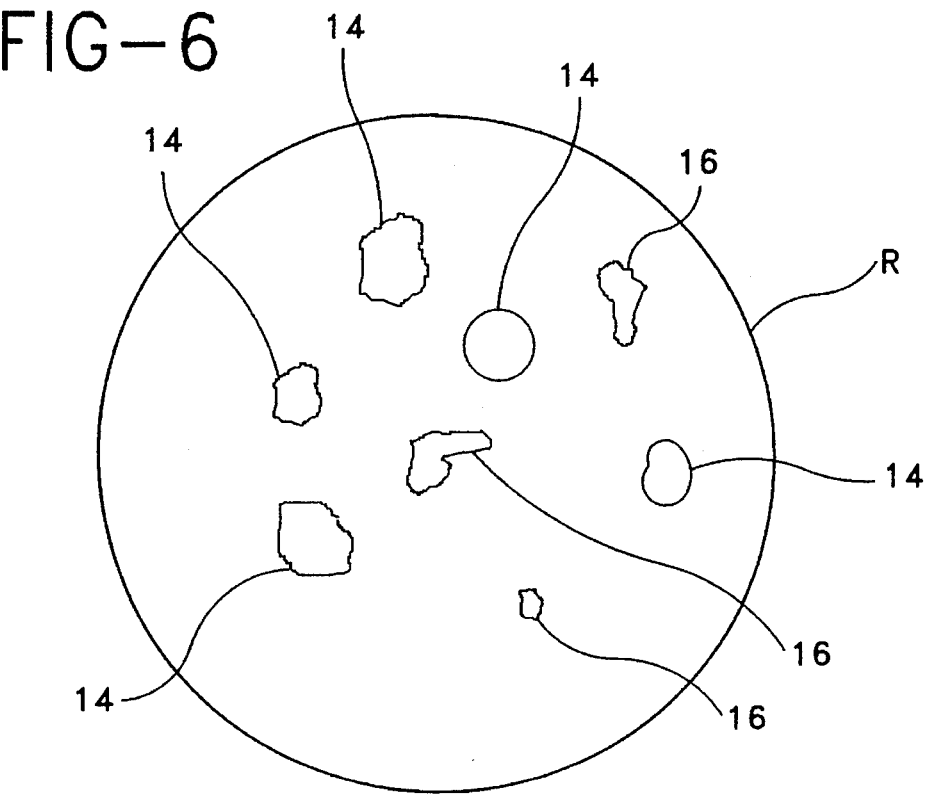
FIG. 6 is an enlarged view of an optical field of the measurement material of FIGS. 4A and 4B as seen through a microscope.

4B where the calibration material and the measurement material have been combined. It is preferred that the samples be cut together so that their tissue sections will have approximately the same thickness, with both cell samples including whole cell nuclei 14 and cell nuclei fragments 16 as illustrated in FIGS. 5 and 6, which are collectively referred to herein as cell objects. The fixed cell samples are then prepared by, for example, the Feulgen staining technique to enhance the features of the cell objects.

The slide 62 is then placed on the carrying stage of a microscope 12 of the apparatus 10 illustrated in FIG. 1, and in accordance with the present invention, the thickness of the tissue section on the slide containing the measurement material is measured with the apparatus 10 using the known DNA content of the measurement material, or the doubling polyploid relationship of the measurement material. Subsequent, this thickness is used by the apparatus to compensate for variations in the nominal thickness. In this way, the apparatus can be used to more accurately analyze the specimen sample on the slide 62. Specifically, the present invention improves the accuracy and reliability of the analysis by insuring that variations in tissue section thickness are recognized and compensated for by the image analysis system utilized by the medical expert, i.e., a pathologist, responsible for diagnosis/prognosis.

Figure 7:
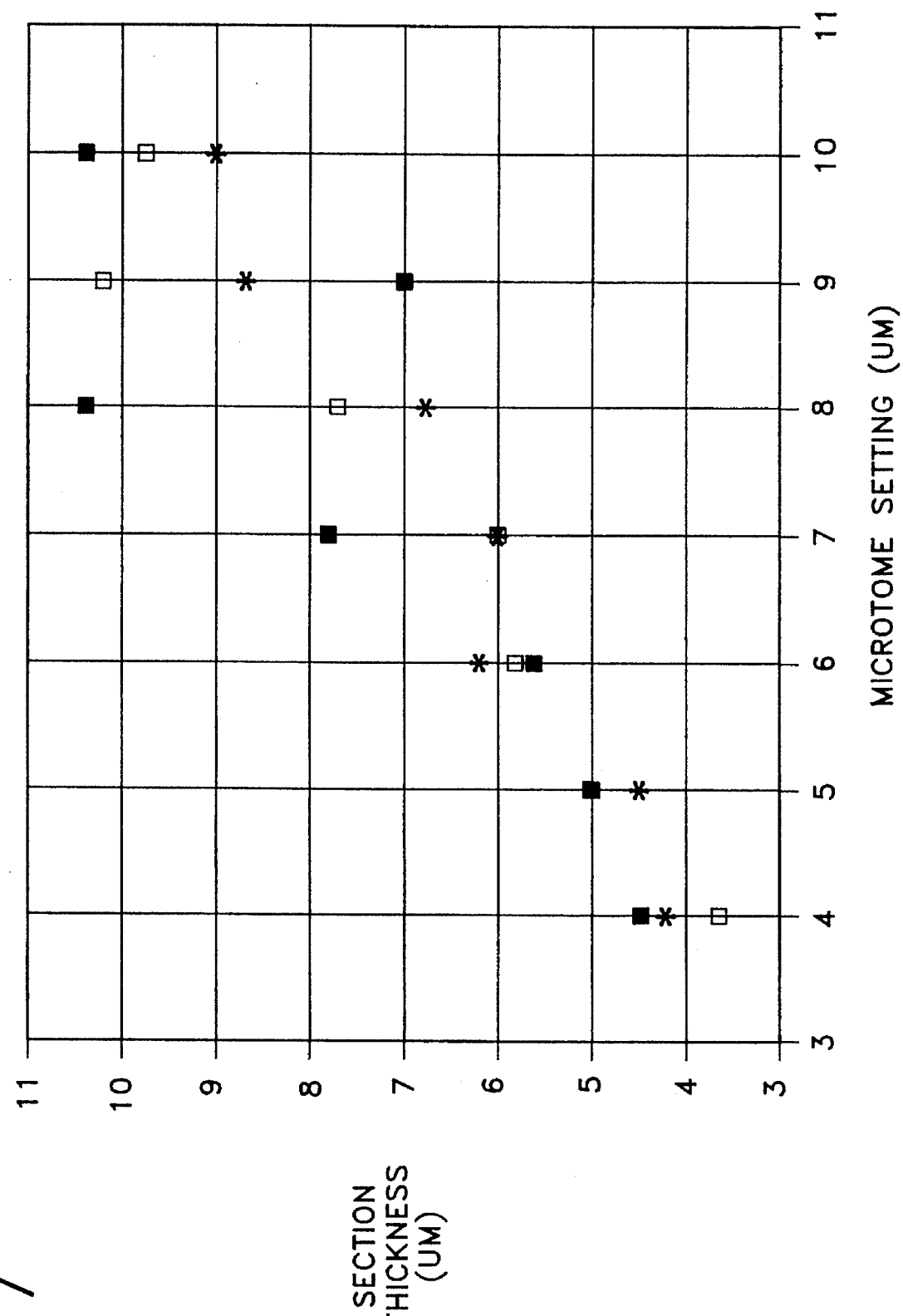
FIG. 7 is a graph comparing the measured thickness of a tissue section with the microtome setting for the nominal thickness.

FIG. 7 graphically compares measured thicknesses of rat liver sections with the recorded setting for a microtome instrument to show the error or variation in thickness. The importance and effect of these variations in thickness is apparent from the correction equations set forth herein below. It is apparent that variations in nominal thickness from actual thickness create errors as a result of the use of the thickness in correcting the DNA mass of fragments.

Usually, after the microscope slide 62 is placed on the carrying stage of microscope 12, the objective 64 is focused thereon. A portion of the light from the objective 64 travels through a beam splitting mirror 80 to eye piece 12 where it may be viewed by an observer. The beam splitting mirror 80 conveys the remainder of the light from objective 64 to camera module 14, which generates an NTSC signal representing the image and applies that signal to image processor 28. Image processor 28 digitizes the image received from camera unit 14 and stores the digitized image in a frame buffer of the image processor. The contents of the frame buffer are presented to an image monitor 30, which displays a field of the cell sample. The digitized image field is also presented to computer 32 over system bus 34 for analysis thereof.

Figure 8:
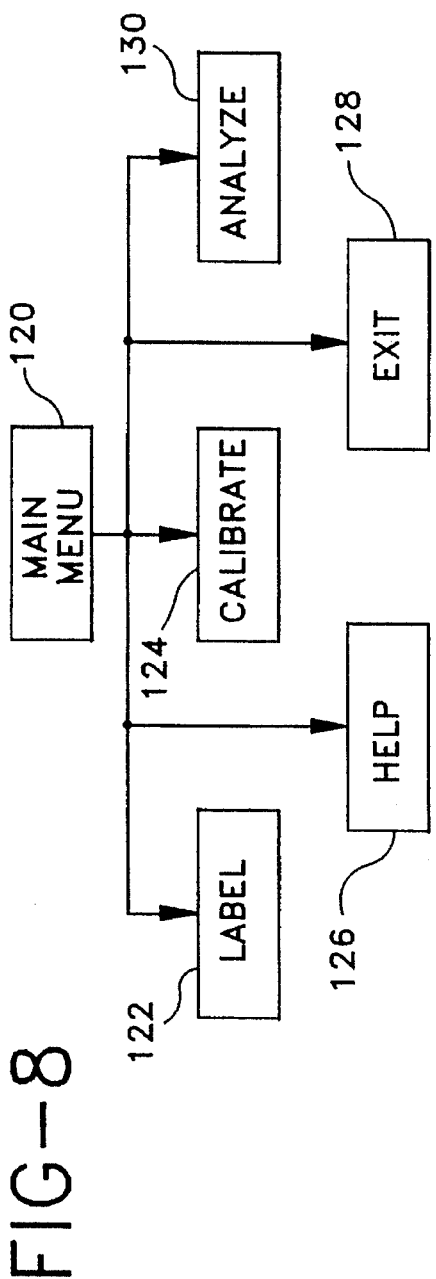
FIG. 8 is a pictorial representation of the main menu options of FIG. 1.

When the apparatus is in operation, the operator has a number of options or functions which can be chosen to acquire and process data from the cell samples. In general, the program setting forth the functions is menu driven and provides on an instruction monitor 52, a main menu of options as shown in FIG. 8. The main menu 120 consists of five main screen functions including a label function 122, a calibrate function 124, a help function 126, an exit function 128 and an analyze function 130. A function is selected from the menu of FIG. 8, as well as other menus presented to the operator, by operator interaction with the mouse 20. The menus are presented on the monitor 52 to the operator who moves a cursor thereon by means of the mouse 20 and selects a desired function by pressing a mouse button, e.g., 21, when the cursor is on the desired function. Mouse interactive menu selection is well known in the art.

The label function 122 allows a user to enter information regarding the patient identification, accession number, and a DNA conversion number. Selection of the calibrate function 124 permits the proper adjustment of the apparatus to assure accurate measurements. The DNA conversion number is the expected DNA mass for a diploid cell. Initially, the DNA conversion number is set by default to a standard 7.18 picograms for normal human cells. However, the index may be changed to the number desired when non-human cells, such as the rat liver sample, are analyzed to measure tissue section thickness. The DNA index number must be set to a value greater than or equal to 1 and less than or equal to 99.99.

In the calibrate function 124 light levels are compared to known standard light levels for appropriate adjustment and the DNA relative optical density of a number of standard cells is determined so that the instrument can be calibrated in mass units, and the DNA mass of the cell objects in the cell sample can be accurately determined. The calibration of the apparatus of the type shown in FIG. 1 is described in detail in U.S. Pat. No. 4,741,043 (James W. Bacus), the disclosure of which is hereby incorporated by reference in its entirety.

The help function 126 of FIG. 8 provides explanation to the operator to aid in the use of the apparatus 10. The exit function 128 permits the system to leave the present main menu function.

The analyze function 130 is performed to specifically analyze the cell objects of a sampled field of cell objects. The menu 142 for the analyze function is shown in greater detail in FIG. 9. It is in the analyze function of FIG. 9 that the thickness of the tissue section is measured and adjusted for any variation with the nominal thickness, which is described in detail herein below. The tissue function 146 is used to measure the thickness of the measurement material and adjust for any variation with the nominal thickness, automatically correct the thickness or to set the thickness of the tissue section under consideration. The thickness is used in certain DNA mass corrections and is discussed below. The analyze function 142 includes a number of sub-functions which are employed to improve the accuracy of cell object attribute measurement. One sub-function is the check light function 148 which calculates the light level of the current field image to assure accuracy of adjustments. A select peak function 152 allows the operator to select or adjust the peak displayed in a histogram. A boundary function 156 allows the operator to set the threshold which must be achieved between the image background and the contrast of an optical entity before that entity is recognized. Scale function 154 permits the adjustment of the horizontal scale of DNA histograms shown on the monitor 52. The analyze function also includes a help function 158 to provide assistance to the operator and a main function 162 which permits the return to the main menu from the analysis menu 142.

The classify function 144 and set filters function 150 are the two most closely related functions to the actual evaluation and measurement of cell object attributes for both the measurement material and the specimen sample. The set filters function allows the operator to establish ranges of predetermined measurable parameters which are used to interpret the attributes of cell objects measured in the classify function.

The ranges may be set by the operator or preselected, and define which cell objects will be automatically selected for reporting and what classes of cell objects are to be automatically assigned to the selected cell objects. The filter ranges are, as discussed below, compared to automatically measured cell object attributes and cell objects will be selected and classified or not, depending on their similarity to the established ranges. The setting of ranges, the automatic measurement of cell objects and the comparison of measurements and filter ranges, replaces the tedious cell object selection and classification by human operators.

Figure 10:
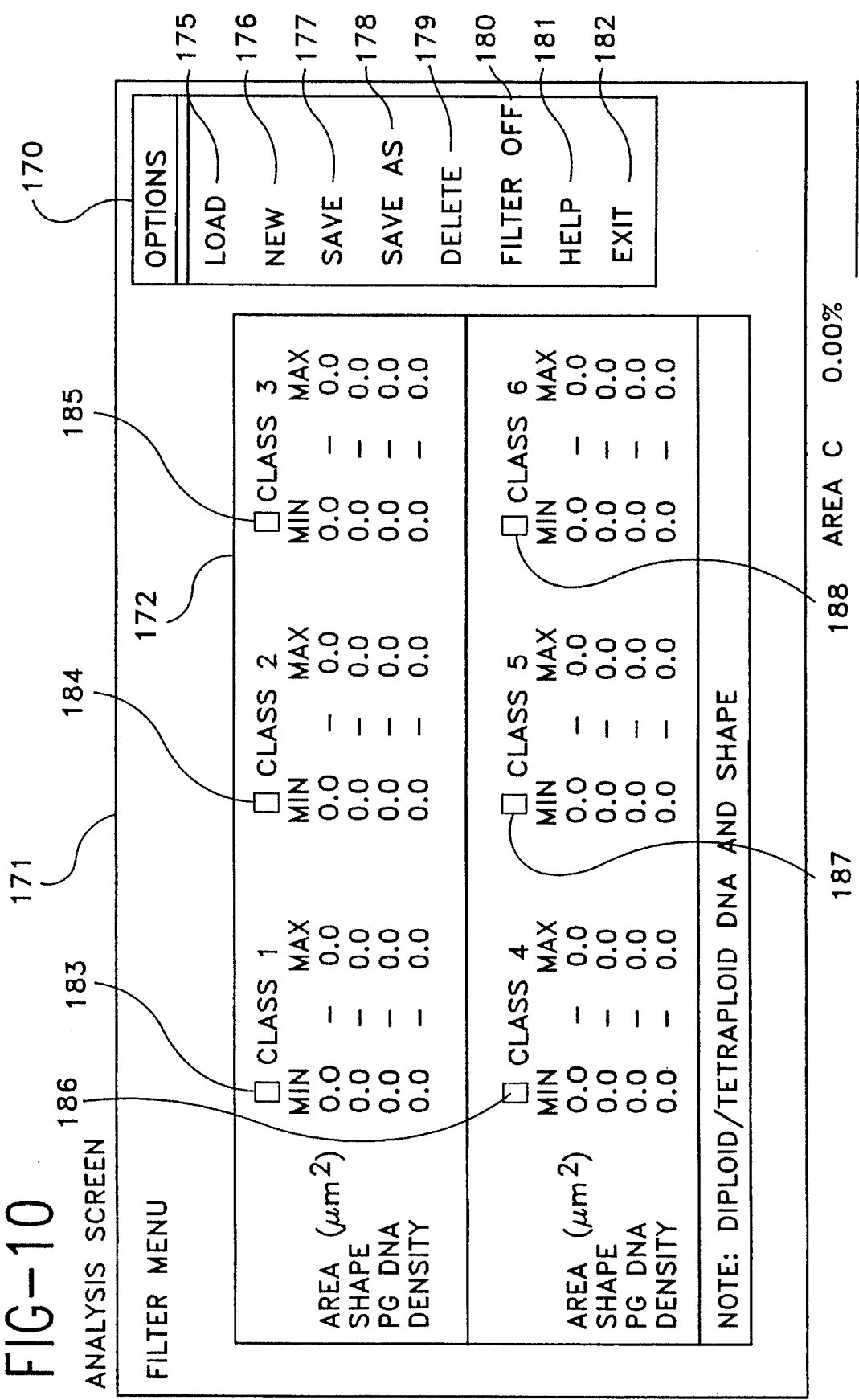
FIG. 10 is a representation of the filter menu screen shown during the set filter function of FIG. 8.

When the set filters function is requested, the filter menu 171 of FIG. 10 is displayed on the analysis screen of monitor 52. The filter menu 171 includes an options field 170 and a filter parameter field 172. Options field 170 sets forth particular functions which can be performed in the set filters function and the parameters field 172 identifies the value ranges of four cell object attributes which are used to automatically place a given cell object into one of six classes identified as class 1 through class 6. When the filter menu is initially presented to the operator on monitor 52, the four attribute value ranges under each class heading are all set to zero.

The options listed in the options field 170 are primarily used to establish ranges of values in the parameter field 172 and to define the use of those parameters. The "Load" option 175 permits the operation to specify the name of a pre-stored file of filter parameters which are read from memory and used to populate the filter parameter field 172. The "New" option 176 permits the operator to directly enter ranges of values into parameter field 172 for each cell object attribute in each class 1 through 6. The "Save" field 177 permits the saving of the values written into parameter field 172. The option "Save As" is similar to the option "Save" 177, except that the saved set of parameters can be given a particular name to aid in later recall. The "Delete" function 179 is used to delete all of the parameters entered in parameter field 172 and the "Filter Off" field 180 enables the use of the classify function 144 without any preassigned filter parameters. As in the previous screens, the "Help" function 181 provides user information and the "Exit" function 182 allows the user he return to the analysis menu 142.

The parameter field 172 includes filter definitions for each of six classes of cell objects. The filter for each cell object class comprises a range of values assigned to each of four cell object attributes listed below that class designation. The four attributes for each class are the area of optical entity in square micrometers, the shape of the optical entity, its DNA mass in picograms and the density of that optical entity. The shape factor in the value ranges is determined by dividing the square of the perimeter of the optical entity by the area of that entity. Thus, a round shape has shape value of 4π and the value becomes larger the "less round" the measured object is, and is well known in the art.

The filter parameters placed in the class definition field 172 depend on whether the measurement material, e.g., rat liver cells, or the specimen sample will be analyzed, and the nominal section thickness. In addition, with respect to the specimen sample, the class definitions will depend upon the particular location from which the cell sample was taken, e.g., breast and the particular type of cell sample e.g., tissue section. Activation of the Load function 175 lists the various pre-set filters available to the operator. The ranges of values shown in FIG. 11 have been found useful in the evaluation of rat liver cell samples having a nominal tissue section thickness of 5 microns and the ranges of values shown in FIG. 12 have been found useful in the evaluation of prostate tissue section cell samples, of nominal 6 microns thickness. However, different ranges will be chosen depending upon the nominal thickness because of the different amounts of DNA for center cut cells.

With the values shown in FIG. 11 for the filter used in connection with the rat liver cell sample, Class 1 identifies small diploid cell objects which are substantially round; Class 3 identifies tetraploid cell objects; and Class 5 identifies octoploid cell objects. With the values shown in FIGS. 12 for the filter used in connection with the specimen cell sample, Class 1 identified small diploid cell objects which are substantially round; Class 2 identifies larger diploid cell objects which are also substantially round; Class 3 identifies S phase cell objects which are of regular shape; Class 4 identifies small diploid cell objects of a more irregular shape than Class 1; Class 5 identifies tetraploid cell objects; and Class 6 identifies cell objects having large amounts of DNA.

After the filter values are established in function 150, the operator can move to the classify function 144 in which cell objects are automatically selected by the apparatus 10 in accordance with the established filter values. In the case where a cell object does not meet the filter ranges for any of the three classes (FIG. 11) for rat liver cells or the six classes (FIG. 12) for the prostate specimen cells, the cell object is not selected for classification.

The flow chart of the classify function 144 is shown in FIG. 13. In the classify function, the digital image of a field of optical entities on slide 62 is analyzed by the microprocessor (FIG. 2). The digitized image is scanned (block 191) until an optical entity is found by the difference in contrast values between the entity and the image background. The microprocessor then proceeds to the measure attribute step 193 where it identifies the perimeter of the found optical entity and counts both the number of pixels on the perimeter and the number of pixels within that perimeter to determine the perimeter and area of the entity found. Also, the microprocessor computes the DNA mass of the found optical entity from the previous calibration data and the density of the cell object by dividing the DNA mass by the area. After the attributes have been measured, an optical entity table (FIG. 14) is established for the optical entity and the measured attributes are stored in the entity table in step 195. The optical entity table for an entity includes its area, shape, class, DNA mass, density, perimeter length and location information. When the optical entity table is initially established for an entity, the class designation is set to 0 to indicate an unselected entity. The class designation for an entity which is assigned a class 1 through 6 is written into the entity table of that entity in later step 199.

After the optical entity attributes are accumulated and stored, they are compared (step 197) with the value ranges established in the filter setting function 150 (FIG. 9) in order to classify the entity. The optical entity attributes of an entity are compared to the six sets of filter ranges 1 through 6 in sequence. When the optical entity is found to be within a class, the entity is assigned to the found class and no further comparison with the ranges of other classes is undertaken. The following is an example of comparison for an optical entity having an area 55, shape 11, DNA mass 10 and density 0.181. The exemplary entity attributes will be first compared to range of class 1 and then class 2, where no matches will be found because the entity area is too large. The entity attributes are next compared with the ranges of class 3 where a match is found. The entity is then assigned to class 3 and further comparisons with class ranges for this entity do not occur, even though this entity might fit into more than one class.

When the measured values of an entity do not fall within any of the ranges of values of any class, the entity is determined in step 198 to not be a useful diagnostic entity and the control program returns the find unmeasured entity step 191 to identify a new optical entity. Alternatively, when the measured attributes fall within all of the ranges of values of one of the classes 1 through 6, the identified class is stored (step 199) in the optical entity table (FIG. 14) of the found entity. After step 199, the flow proceeds to a block 321 to determine if DNA correction is needed. For the present example, the DNA correction, which is discussed below, is not needed and the program returns to block 191 to search for another optical entity.

When all of the optical entities in a field have been measured, no unmeasured object will be found in step 191 and flow proceeds to a review function 201. The review function 201 begins with the display (FIG. 15) on image monitor 30 of the optical field presently being reviewed. The displayed field is enhanced by drawing a line around each optical entity which was assigned one of the classes 1 through 6 (step 197), FIG. 13). The line around the perimeter is called perimeter enhancement and indicates that the included optical entity has been selected and classified. All non-selected optical entities in the field are displayed without perimeter enhancements.

The perimeter enhancement for a selected optical entity consists of a line around the selected optical entity, having a color which is uniquely associated with the class assigned to that optical entity. The association of classes 1 through 6 and colors is represented in FIG. 10 by a rectangle, e.g., 183 next to the designation of each class, e.g., class 1. In FIG. 10, rectangles 183 through 188 are shown in association with classes 1 through 6 respectively. The color of the rectangles 183 through 188 is described in Table 1.

TABLE 1

| Rectangle | Class | Color |
|---|---|---|
| 183 | 1 (diploid) | Blue |
| 185 | 3 (tetraploid) | Green |
| 187 | 5 (octoploid) | Violet |

The encirclement of an optical entity by a colored line provides the operator with a direct indication of the class assigned to that optical entity, but does not obscure the optical entity from view.

Figure 15:
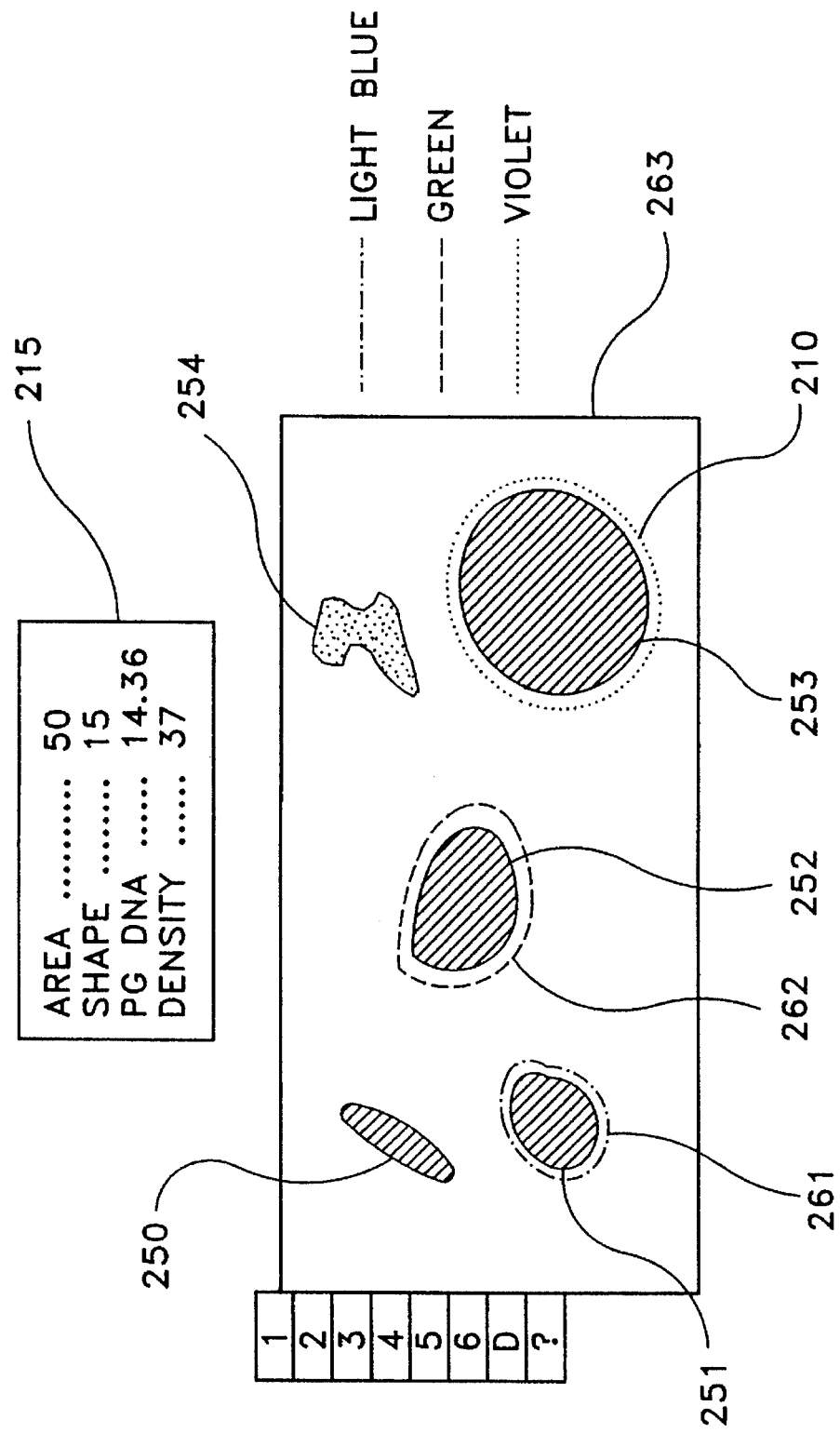
FIG. 15 is a representation of a video screen presented during the review function of FIG. 8.

The review image represented in FIG. 15 includes five optical entities 250 through 254 of which entities 250 and 254 do not have perimeter enhancements, while entities 251, 252 and 253 are encircled by perimeter enhancements 261, 262 and 263 respectively. For purposes of illustration, it is assumed that entity 250 is a cell object fragment having DNA mass of less than 5 picograms and that entity 254 has a DNA mass between 9 and 12.2 picograms, but is too irregular (shape greater than 14.5) to be tetraploid cell. Thus, the entities 250 and 254 were not selected to be in a class and are not reproduced with enhanced perimeters. Entity 251 is produced on display 30 and represented in FIG. 12 with a blue perimeter 261, (-.-.-.-) indicating a diploid cell object, entity 252 is produced with a green perimeter 262, (....) indicating a tetraploid cell object and entity 253 is produced with a violet perimeter 263, (----) indicating an octoploid cell object. The cell objects and their enhanced perimeters are observed by the operator during the review function.

The review function is an operator interactive operation, the menu for which is represented in FIG. 16. In the review function 201, the operator can select a help function 204 or an exit function 206 which are substantially similar to the previously described help and exit functions. Should the operator select the exit function 206, classifications assigned to the optical entities displayed (FIG. 15) are retained and the measured attributes of those selected entities will be used to produce final reports such as the DNA histogram. If the operator feels that further review of the field is desirable he or she selected the "chosen entity" function 208 which produces a mouse cursor 210 on the field viewing screen 30 represented in FIG. 15. By manipulation of mouse 20, the mouse cursor 210 is placed on an optical entity e.g., 253 (either previously classified or previously not classified) in question and that entity is chosen for review by depressing a key 21 on the mouse 20. When an entity is chosen its entity table (FIG. 14) is identified for use by comparing the X, Y position of the cursor 210 with the X and Y location information of optical entities are previously stored in the entity tables. After choosing an entity for review, the operator has three additional functions which can be selected. The display attributes function 214 produces on the review screen of FIG. 15, an attributes field 215 which displays the previously measured and stored attributes of the optical entity chosen for review. The attributes displayed in field 215 provide additional information to the operator on which decisions can be made.

Based on the viewed optical entity and the displayed attributes in field 215, the operator may wish to change the class to which the chosen entity was previously assigned. Change class function 212 is used to provide this change. The selection of the change class function 212 displays a numerical listing 217 (FIG. 15) of the number 1 through 6, D, and ?. The operator can place the mouse cursor 210 on any of the items and press button 21 to enact a change of classification. Selecting one of the number 1 through 6 changes the classification of the chosen entity to the new class number. If D is identified from the list 217, the cell is deleted. Upon a change of class the new class number r is stored in the associated entity table (FIG. 14) and, the colored perimeter of the selected entity is changed to a color representing the newly assigned class.

While in the choose entity function 208, the operator may observe two overlapped cell objects which appear to have been considered during automatic classification as a single optical entity. The operator can move the cursor to select such an entity. The cut entity function 216 can then be selected in which the operator, using known techniques, separates the selected optical entity into two parts for analysis purposes. After the cut entity function 216 the control program returns to the flow chart of FIG. 13 to reevaluate the cut entity as two entities in accordance with the operator's direction. At the conclusion of the reevaluation of the two new entities control returns to the review menus 201 in the choose function 208. The newly cut entity is then displayed, if appropriate, with enhanced perimeters around either portion of the entity.

Figure 9:
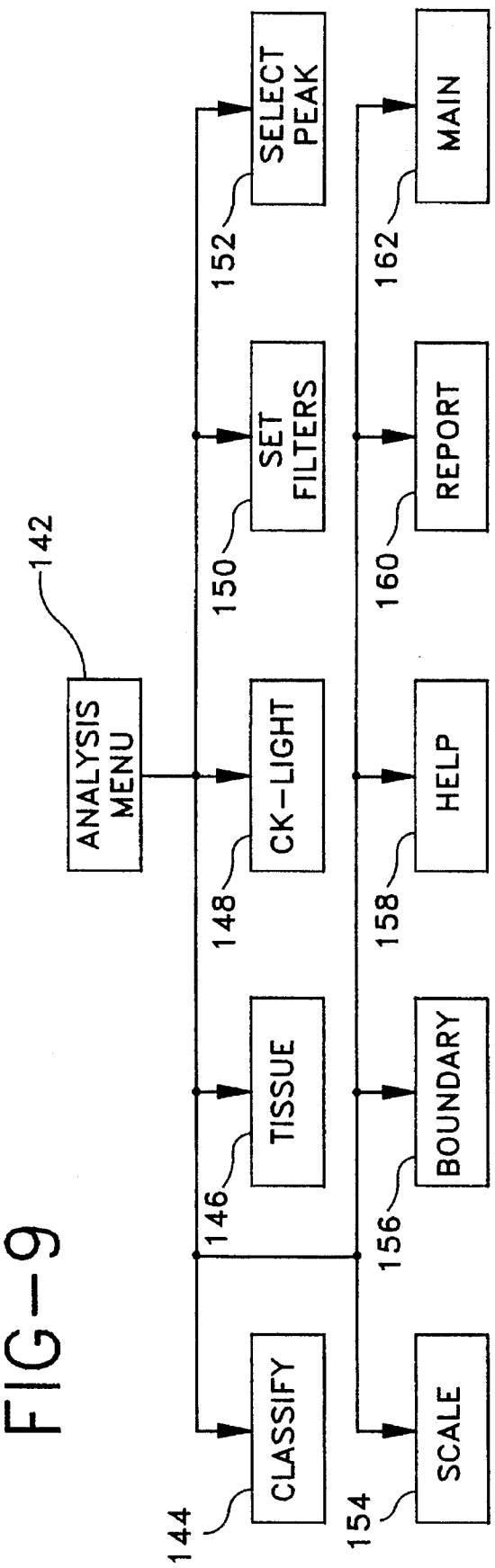
FIG. 9 is a pictorial representation of the analyze function of FIG. 8.

At the conclusion of the choose entity function 208, the operator returns to the exit function 206 which transfers control back to the analysis menu 142 (FIG. 9). In the analysis menu, the operator can select the report function 160 to prepare reports such as a DNA histogram. The data for reports is read from the entity tables of the optical entities of the cell sample.

The previously described operations both simplify and accelerate the cell analysis operation by assisting an operator in the analysis process and automatically performing many of the routine portions of the analysis. Although difficult to quantify, the operator assistance provided by the present apparatus is believed also to improve the accuracy of final analysis and reporting. An additional capability, described below, directly improves the accuracy of final reports particularly DNA histogram reports when they result from an analysis of cells prepared from tissue sections.

As previously discussed, the cell samples are prepared from tissue sections, and FIG. 17 is an edge view of a tissue section 300 of thickness T showing a plurality of cell objects 301 through 305. Tissue section 300 has a top surface 310 formed by one slicing operation and a bottom surface 311 formed by another slicing operation. FIG. 17 is a top view of the same tissue section which represents the view of FIG. 17 presented to analysis apparatus. In FIG. 17, the solid line cell objects and cell object fragments are those remaining for analysis and the dotted lines above and below surfaces 310 and 311 represent the portions of cell objects which have been sliced away by tissue sectioning. Cell objects 301 and 302 represent small fragments of relatively small cell objects. Cell objects 303 and 304 represent whole cell objects and cell object 305 represents a large cell object with relatively small top and bottom portions sliced away.

By presumption, fragments 301 and 302 will not be selected during analysis, since they are so small and lack sufficient density and DNA mass to match any of the filters of FIG. 11. Cell objects 303 and 304 are presumably whole diploid cell objects and will be selected by the automated process. Cell object fragment 305, which is assumed to represent an octoploid cell, will be selected by the filters but its measured DNA mass value will be less than its unfragmented value. That is, the DNA content of the sliced away dotted line portions will not be included in its DNA mass. Thus, reporting fragment 305 as a whole cell object on the DNA mass histogram, will cause a point to appear with less mass than it should have.

For purposes of the following example, it is assumed that cell objects 303 and 304 have measured areas of 22 square microns and are selected as class 1 cell objects and that cell object 305 has a measured area of 90 square microns, a DNA mass of 19 picograms and will be selected as a class 5 cell object. The present embodiment includes methods for correcting the DNA mass values of cell object fragments, such as fragment 305 to more accurately represent their unfragmented DNA mass. Both the need for DNA mass correction, and the amount of correction is dependent on the thickness of the tissue section which was used to provide the cell sample being analyzed. The tissue section thickness is established in the apparatus by performing the section thickness function 146 of the analysis menu of FIG. 9. For the purposes of the present example, the tissue section 300 has a nominal thickness T of 5 microns, so that the value 5 microns may be initially entered in the set tissue thickness function 146 before the apparatus 10 is used to measure the thickness of the tissue section.

Figure 20:
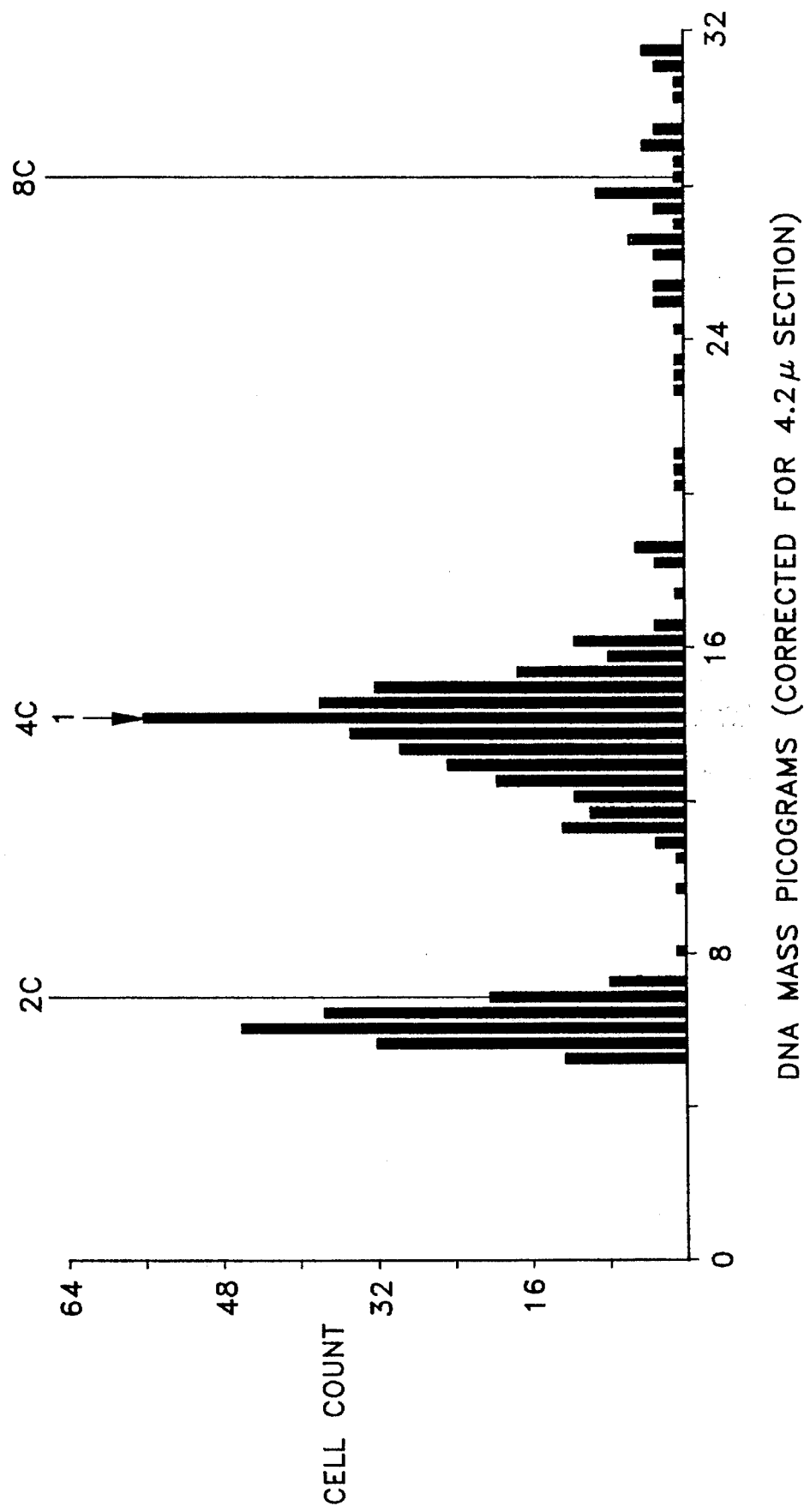
FIG. 20 is a histogram of a video screen presented during measurement of the tissue section during the operation of FIG. 19.

After the section thickness function has been selected, the Tissue Section menu 400 appears as illustrated in FIG. 19. The menu identifies the nominal section thickness entered 402 and permits the operator to either manually measure the thickness of the tissue thickness by toggling 404 the entered thickness or by automatically correcting 406 the entered thickness the menu also will display an "on" or "off" indication 408 for the convenience of the operator. With respect to a specific rat liver cell line, it is known that it will include only diploid, tetraploid and octoploid cells, which upon correction of their mass, as described below, should provide a histogram with the cells closely aligned around the 2C, 4C and 8C points as illustrated in FIG. 20. Accordingly, if their is any variation in the nominal thickness, the cells will not be so aligned as illustrated in FIG. 21. Accordingly, by toggling the entered thickness, the various peaks can be moved within the histogram to align themselves about either the 2C, 4C or 8C points of the graph illustrated in FIG. 20 for a section thickness having a measured thickness of 4.2 microns.

Figure 22A:
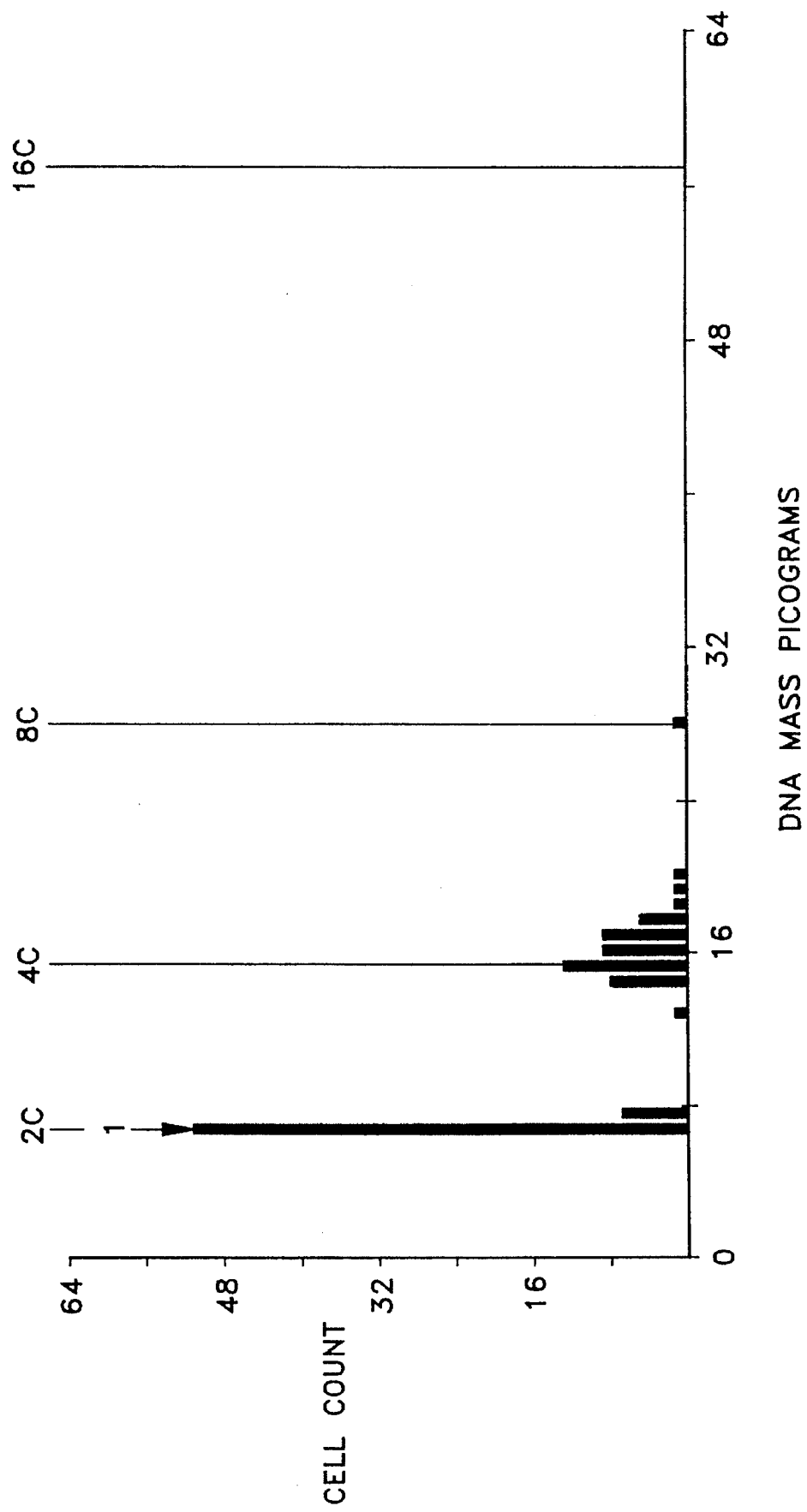
FIGS. 22A and 22B histograms of video screens presented, with FIG. 22A showing a histogram for a needle aspirate and FIG. 22B showing a histogram after correction of the tissue section thickness during the auto correction operation of FIG. 19.
Figure 22B:
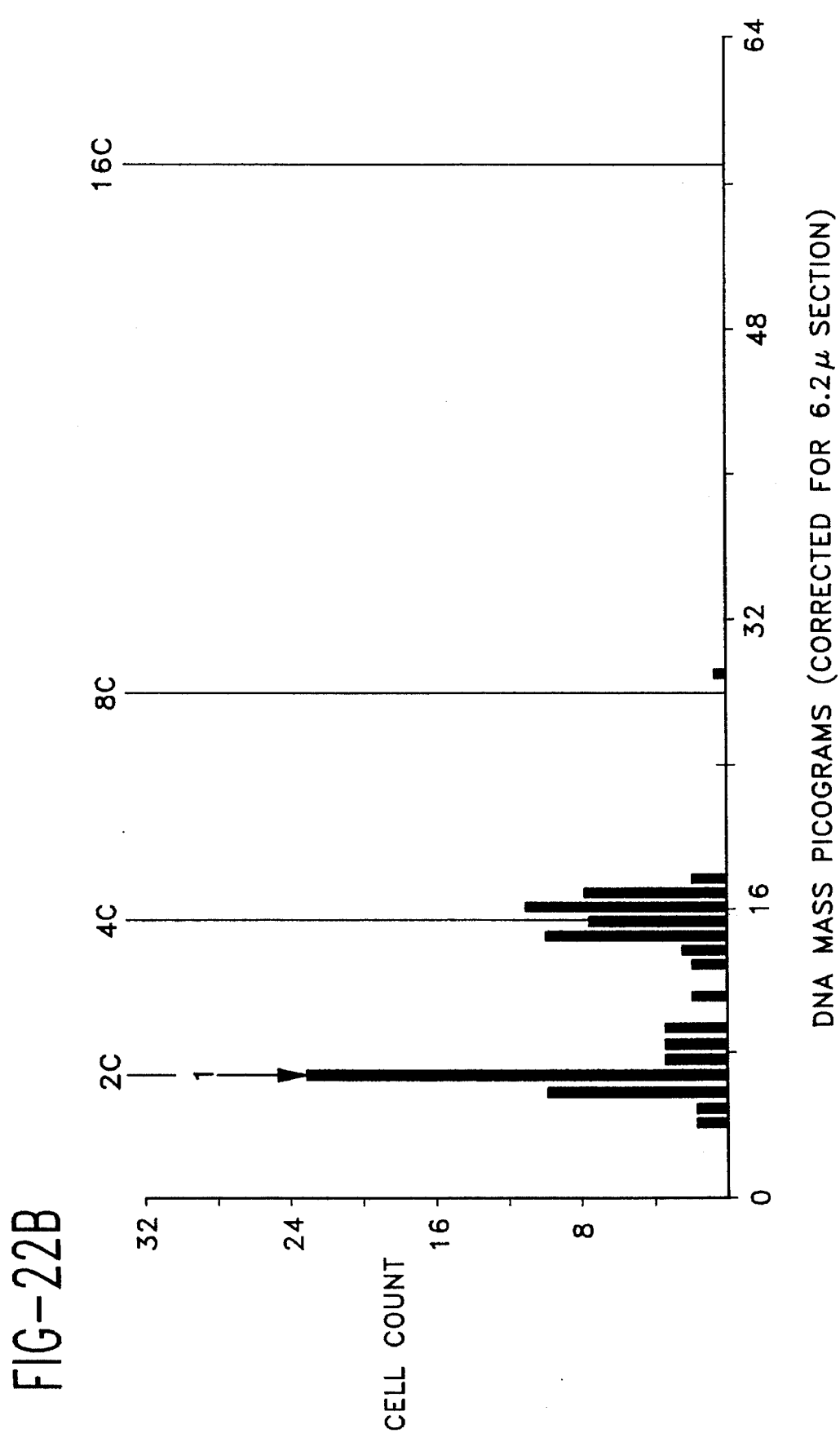

In the alternative, the thickness of the tissue section can be automatically determined by the apparatus through an envelope method, which automatically iteratively corrects the thickness setting for various values beginning with, e.g., 15 microns until the peak containing diploid cells begins to move. FIGS. 22A and 22B illustrate the relationship of the prostrate diploid cells, which normally do not need correction since the thickness of the tissue section will leave them fully intact, with FIG. 22A showing a histogram for a needle aspirate and FIG. 22B shows a histogram auto corrected for thickness. Accordingly, it is recommended that the nominal thickness at least be approximately 4–5 microns.

Figure 23:
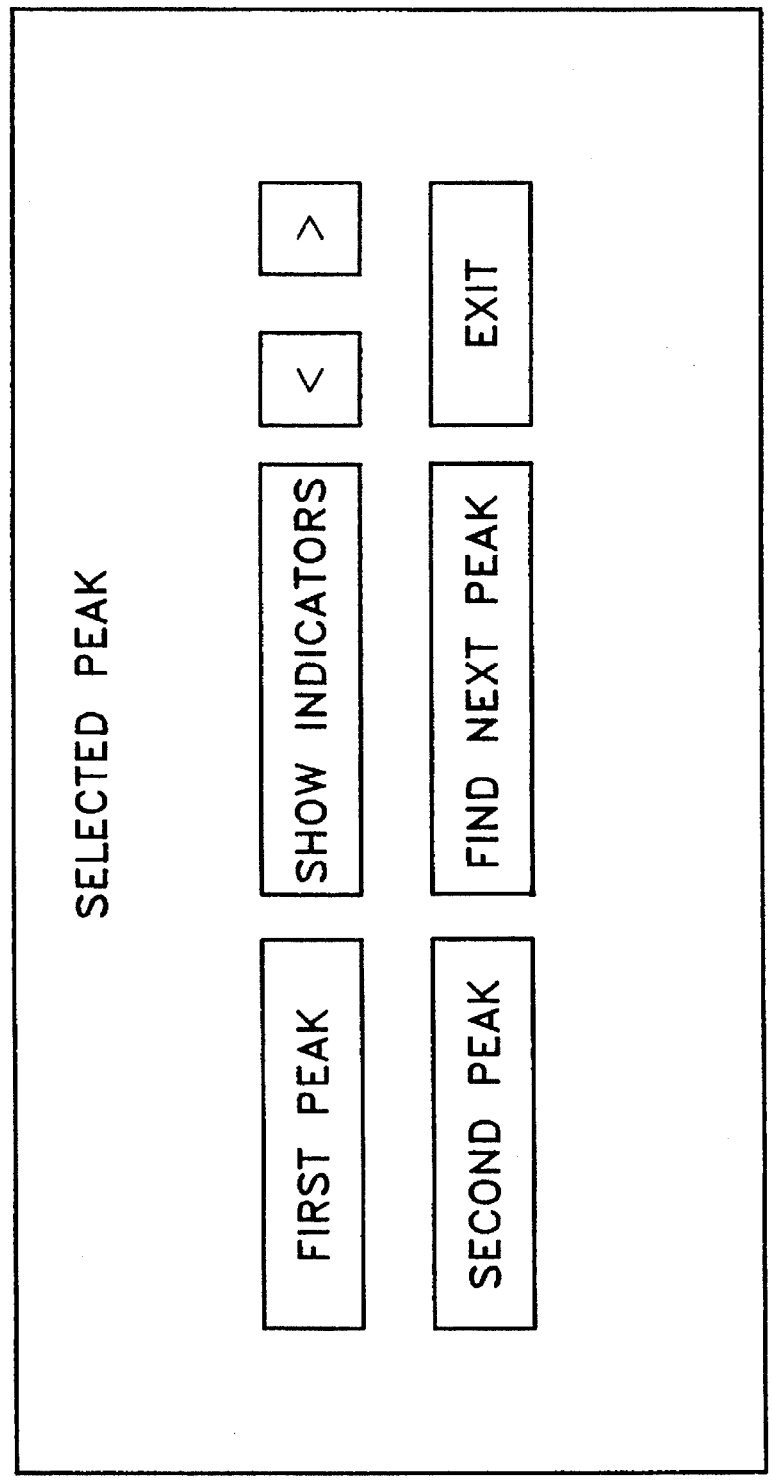
FIG. 23 is a representation of a video screen presented during the select peak function of FIG. 9.

To initiate the envelope method, the operator must return to the Analysis menu 142 illustrated in FIG. 9 and select the peak selection function 152. The Selected Peak menu 500 (FIG. 23) appears to move or otherwise position one of two peak indicators. Upon completion of the peak selecting function, the operator returns to the analysis menu 142 (FIG. 9) and again selects the thickness setting function 146. The peak is selected based upon the nominal thickness so that the attributes of the cell objects associated with the peak are fully enclosed within the tissue section, otherwise only fragments of cell objects will be utilized. It has been found that, while the auto correction function is less time consuming, it is not as accurate as having a measurement material for correcting the thickness. However, it has the advantage that it may be used on the specimen itself, e.g., an obvious diploid peak with the required area of nucleus.

Figure 24:
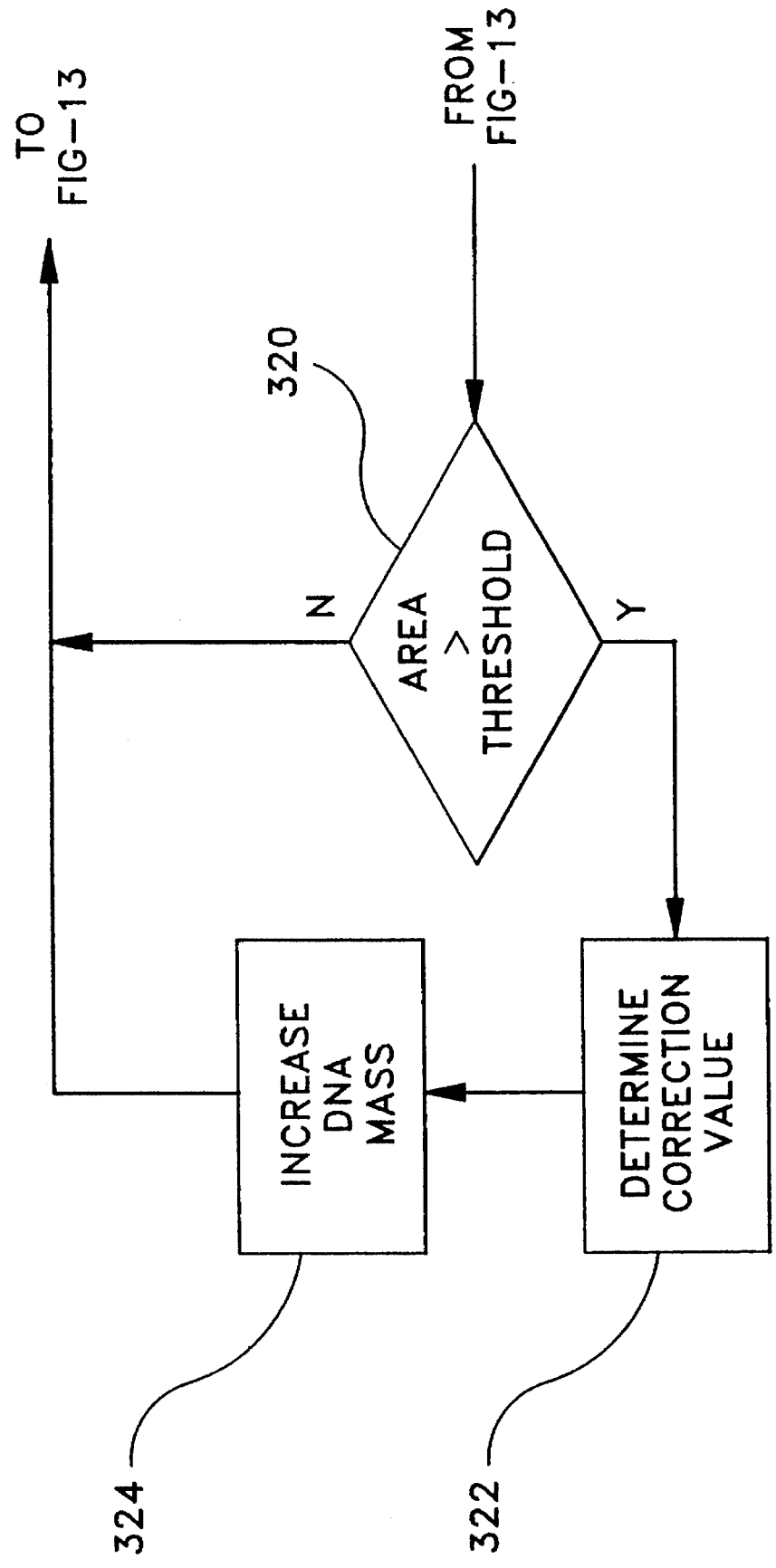
FIG. 24 is a flow diagram of a DNA mass correction function.

A flow diagram of the DNA mass correction operation is shown in FIG. 24 when the tissue section thickness toggle is on and a given section thickness is know, which is an adjunct to the classify flow diagram of FIG. 13. However, when the toggle is off, no correction is made. The classify function is performed as shown in FIG. 13 and when a cell object such as the cell object fragment 301 is not selected for classification, the flow proceeds from block 198 to block 191, as previously discussed. When a cell object is selected for classification, the assigned class is written into the entity table (FIG. 14) of that cell object and the flow proceeds to block 321 to determine if correction is to be invoked. When correction is to be invoked, flow proceeds to the correction function of FIG. 24. The correction function begins in block 320 (FIG. 24) where the measured area of the cell object is compared to a threshold value determined from the tissue section thickness. The threshold value is the area of a circle having a diameter equal to the tissue section thickness. For the 5 micron tissue section of the present example, threshold of block 320 is approximately 20 square microns. Block 320 is performed to identify large cell fragments such as cell object fragment 305, which need correction and to not identify for correction smaller whole cell objects such as a 303, which do not need correction.

When whole cell object 303 (area=19 square microns) is being classified, step 320 determines that the threshold of 20 square microns is not exceeded and the flow proceeds to block 191 without correcting the DNA mass value of whole cell object 303. When cell object fragment 305 is classified, it will be placed in class 3 (see example assumptions) and block 320 will determine that the measured area (50 square microns) is large than the square micron threshold. A measured area greater than the threshold indicates that the entire cell object is unlikely to exist in the 5 micron thickness, and that DNA mass correction is needed. After a determination that the measured area of a cell object exceeds the threshold, a block 322 is performed to determine a correction value for the cell object. The correction value is determined from the measured area of the cell object and the thickness of the tissue section sample.

The correction value C is calculated from equation 1:

$$C = \frac{3T}{4R} - \frac{T^3}{16R^3}$$

where T is either the measured or nominal tissue section thickness and R equals the square root of the measured area divided by π. Given the 50 square micron measured area of cell object 305, R is approximately equal to 3.99 microns yielding a correction value C of 0.817. After the correction value is determined in block 322, the measured cell object mass is divided thereby in block 324 to increase the DNA mass to a corrected value. In the present embodiment, the measured mass of cell object 305 (11.7 picograms) is increased to 14.32 picograms in block 324. The corrected mass value, which more accurately represents the mass of cell object 305 before sectioning, is then recorded for use in the preparation of reports such as DNA histograms from block 324, the flow proceeds to block 191 (FIG. 13).

In the previous example of the correction function, a correction value was calculated for each cell object fragment identified to have an area greater than a predetermined threshold. The equation need not be performed for each identified cell object. Instead, the equation can be performed for many hypothetical combinations of tissue section thickness and measured cell object area and the results (the value C) stored in a look up table. This table can then be accessed directly from the tissue section thickness and cell object area to speed processing. Additionally, other methods for populating the correction value look up table could be used. For example, empirical data correlating measured cell object fragment area and the actual DNA mass of whole cell objects may be obtained from tests and used to populate the correction value look up table.

In the preceding example, cell objects were selected and assigned to classes before correction of DNA mass was performed. The DNA mass correction of FIG. 24 could have been performed before selection. In such a case, the function performed by FIG. 24 could be entered after block 195 (FIG. 13) with a return from the correction function to block 197. In this way, classes would be assigned to identified cell objects on the basis of corrected cell object mass values. Some cell evaluation systems measure DNA in relative terms and assign cell objects a relative DNA index value. The present invention can be used to correct any DNA mass measurement value, be it specific mass in picograms or a relative mass value such as a DNA index value.

Alternatively, the measurement material may include a known cell line having a known size and mass which would be fully enclosed within the tissue section and not relevant to the analysis of the specimen sample. Such a material would in essence act as marker within the histogram for the specimen sample, and upon automated correction, permit the thickness to be iteratively changed until the position of the marker begins to move.

In addition, it should be appreciated that although the preferred method and apparatus of the present invention have been discussed in connection with the analysis of a specimen sample, a measurement material embedded in the paraffin block may be used to calibrate the microtome instrument or in any case monitor the accuracy of the setting for the instrument. In this way, the "nominal" thickness can be assured of some degree of reliability and consistency for subsequent use in connection with the apparatus.

While a preferred embodiment of the invention has been illustrated, it will be obvious to those skilled in the art that various modifications and changes may be made thereto without departing from the scope of the invention as defined in the appended Claims. The preceding description is intended to be exemplary and should not be used to limit the scope of the invention. The scope of the invention should be determined only by reference to the following claims.

What is claimed is:

1. A method of analyzing a specimen cell sample in an automatic analyzing apparatus comprising the steps of:

providing a measurement cell sample and a specimen cell sample;

measuring, by said automatic analyzing apparatus, attributes of individual cell objects of said measurement cell sample and said specimen cell sample and selecting a plurality of said cell objects from said measurement cell sample and said specimen cell sample;

comparing by said automatic analyzing apparatus said measured attributes to predetermined parameters distinctive of said cell objects;

determining a thickness of the measurement cell sample from a distribution of said cell objects of said measurement cell sample;

utilizing the determined thickness of said measurement cell sample in analyzing said specimen cell sample by said automatic analyzing apparatus; and identifying ones of said cell objects which are to have their DNA mass values corrected and correcting the DNA mass value of said identified ones of said cell objects by an amount computed from said determined thickness of said measured cell sample.

2. The method of claim 1 wherein said measured attributes includes the area of said cell objects.

3. The method of claim 2 further comprising the step of determining correction values corresponding to predetermined combinations of measured tissue section thickness and measured cell object area and storing the predetermined correction values in a correction value table; and wherein said correcting step comprises reading from said correction value table a correction value corresponding to said predetermined combination of measured tissue section thickness and said measured cell object area for correcting the DNA mass value of said identified ones of said cell objects.

4. A method of analyzing a cell sample in an automatic analyzing apparatus to measure a thickness of a tissue section to calibrate a setting of a microtome instrument, said method comprising the steps of:

providing a cell sample comprising whole cell objects and cell object fragments caused by slicing a tissue section for analysis;

measuring, by said automatic analyzing apparatus, attributes of individual cell objects of said cell sample;

comparing by said automatic analyzing apparatus said measured attributes to predetermined parameters distinctive of whole cell objects and selecting a plurality of said cell objects;

determining the thickness of the tissue section thickness from the distribution of said selected cell objects;

identifying ones of said selected cell objects which are to have their DNA mass values corrected and correcting the DNA mass value of said identified ones of said selected cell objects by an amount computed from the determined tissue section thickness and the measured attributes of the cell objects to be corrected; and assigning one of a plurality of mutually exclusive cell object classes to each cell object selected in said comparing step and displaying in association with each of said selected cell objects, indicia of the class assigned thereto in said assigning step.

5. A method of analyzing a cell sample in an automatic analyzing apparatus to measure a thickness of a tissue section to calibrate a setting of a microtome instrument, said method comprising the steps of:

providing a cell sample comprising whole cell objects and cell object fragments caused by slicing a tissue section for analysis;

measuring, by said automatic analyzing apparatus, attributes of individual cell objects of said cell sample;

comparing by said automatic analyzing apparatus said measured attributes to predetermined parameters distinctive of whole cell objects and selecting a plurality of said cell objects;

determining the thickness of the tissue section thickness from the distribution of said selected cell objects;

identifying ones of said selected cell objects which are to have their DNA mass values corrected and correcting the DNA mass value of said identified ones of said selected cell objects by an amount computed from the determined tissue section thickness and the measured attributes of the cell objects to be corrected;

establishing a threshold value of cell object area for said measured tissue section thickness; and said identifying step comprises identifying ones of said selected cell objects having an area as measured in said measuring step, which exceeds said threshold value.

6. A method of analyzing a cell sample in an automatic analyzing apparatus comprising the steps of:

providing a cell sample;

measuring, by said automatic analyzing apparatus, attributes of individual cell objects of said cell sample;

comparing by said automatic analyzing apparatus said measured attributes to predetermined parameters distinctive of said cell objects and selecting a plurality of said cell objects;

determining a thickness of the cell sample from a distribution of said cell objects of said cell sample; and identifying ones of said cell objects selected during said comparing step which are to have their DNA mass values corrected and correcting the DNA mass value of said identified ones of said cell objects by an amount computed from said determined thickness of said cell sample.

7. The method of claim 6 wherein said measured attributes includes the area of said cell objects.

8. The method of claim 7 further comprising the step of establishing a threshold value of cell object area for said determined thickness of said cell sample; and said identifying step comprises identifying ones of said selected cell objects having an area as measured in said measuring step, which exceeds said threshold value, 9. The method of claim 7 further comprising the step of determining correction values corresponding to predetermined combinations of measured tissue section thickness and measured cell object area and storing the predetermined correction values in a correction value table; and wherein said correcting step comprises reading from said correction value table a correction value corresponding to said predetermined combination of measured tissue section thickness and said measured cell object area for correcting the DNA mass value of said identified ones of said cell objects.

10. The method of claim 6 further comprising the step of utilizing the thickness of said cell sample in analyzing a specimen cell sample by said automatic analyzing apparatus.

* * * * *